US012775372B2

(12) United States Patent
Decker et al.

(10) Patent No.: US 12,775,372 B2
(45) Date of Patent: Oct. 27, 2026

(54) SYSTEMS, METHODS, AND INTERFACES FOR TRACKING DEFECTS

(71) Applicant: PPG Industries Ohio, Inc., Cleveland, OH (US)

(72) Inventors: Christian J. Decker, Wadsworth, OH (US); Timothy M. Vrabel, Pittsburgh, PA (US); John W. Walker, Pittsburgh, PA (US); Eric E. Gurinowitsch, Beaver Falls, PA (US); Charles J. Beyer, New Kensington, PA (US); Edward S. Pagac, Metamora, MI (US); Steven P. Phillips, Toledo, OH (US); Brian V. Yordnoff, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 173 days.

(21) Appl. No.: 18/693,605

(22) PCT Filed: Sep. 22, 2022

(86) PCT No.: PCT/US2022/076844
§ 371 (c)(1),
(2) Date: Mar. 20, 2024

(87) PCT Pub. No.: WO2023/049792
PCT Pub. Date: Mar. 30, 2023

(65) Prior Publication Data

US 2024/0393931 A1 Nov. 28, 2024

Related U.S. Application Data

(60) Provisional application No. 63/247,134, filed on Sep. 22, 2021.

(51) Int. Cl.
*G06F 3/04845* (2022.01)
*B05C 11/00* (2006.01)
*G06F 3/0482* (2013.01)

(52) U.S. Cl.
CPC .......... *G06F 3/04845* (2013.01); *B05C 11/00* (2013.01); *G06F 3/0482* (2013.01)

(58) Field of Classification Search
CPC ... G06F 3/04845; G06F 3/0482; B05C 11/00; G05B 2219/32192; G05B 2219/35488;
(Continued)

(56) References Cited

U.S. PATENT DOCUMENTS 6,398,870 B1 * 6/2002 Kaya .................. G01N 21/8851 118/712
6,528,109 B1 * 3/2003 Filev ....................... B05B 12/12 118/712
(Continued)

FOREIGN PATENT DOCUMENTS

KR 20130017338 A 2/2013
WO 2016172316 A1 10/2016
WO 2021/084381 A1 5/2021

OTHER PUBLICATIONS

International Search Report and Written Opinion received for PCT Application Serial No. PCT/US2022/076844 dated Jan. 13, 2023, 12 pages.

*Primary Examiner* — Kenny Nguyen

(57) ABSTRACT

A computer-implemented method can include identifying and tracking defects that arise in the operation of painting vehicles through a graphical user interface that enables display of a cumulative "heat map." Computerized systems may employ methods for displaying a modeled vehicle, alongside various vehicle attributes, containing the identified defects. The defects can be sorted, identified, and/or grouped by type, location, where and when in the process the
(Continued)

defect occurs, or other relevant defect or vehicular information. When the modeled vehicle is displayed, the variety of defects will be displayed and can easily be identified, for example, by using designated colors for each defect. The variety of defects may be overlaid on the modeled vehicle to provide a "heat map." showing areas of high defect concentration and areas of low defect concentration. Such methods may be implemented, for example, in an application.

21 Claims, 21 Drawing Sheets

(58) Field of Classification Search
CPC ........... G05B 2219/35501; G05B 2219/35502; G05B 19/41875; Y02P 90/02
See application file for complete search history.

(56) References Cited

U.S. PATENT DOCUMENTS 6,826,497 B1 * 11/2004 Collins ................... H04L 67/12 702/81
7,020,580 B2 * 3/2006 Peters ................... G06F 11/321 714/48
9,886,771 B1 * 2/2018 Chen ................... G06F 3/04845
10,132,790 B2 * 11/2018 Dattilo ................... G06Q 10/10
11,410,474 B2 * 8/2022 Crequer ................. G06V 20/20
12,181,862 B2 * 12/2024 Arthur .................. G06T 7/0004
12,461,512 B2 * 11/2025 Angelosante ....... B05B 13/0452
2003/0139836 A1 * 7/2003 Matthews .......... G01N 21/8806 700/109
2004/0117131 A1 * 6/2004 Peters ................... G06F 11/321 714/E11.182
2005/0251303 A1 * 11/2005 Tsubota ............... B62D 65/005 701/29.3
2012/0297337 A1 * 11/2012 St. Denis ........... G06Q 30/0613 705/305
2014/0365335 A1 * 12/2014 Tyshuk .............. G06Q 30/0623 705/26.61
2015/0193994 A1 * 7/2015 McQuade .............. G07C 5/008 701/29.3
2017/0277979 A1 * 9/2017 Allen .................. G06F 18/2411
2019/0096057 A1 * 3/2019 Allen .................... G06T 7/0008
2019/0238796 A1 * 8/2019 Allen ..................... H04N 7/181
2020/0072779 A1 * 3/2020 Ye ......................... B60R 16/023
2020/0357204 A1 * 11/2020 Crequer ............... G07C 5/0841
2022/0358634 A1 * 11/2022 Penny .................. G06V 10/766
2022/0358637 A1 * 11/2022 Penny ....................... G06T 3/18
2022/0358669 A1 * 11/2022 Penny ................... G06F 3/0481
2022/0358756 A1 * 11/2022 Dhanani ................... G06T 7/70
2022/0382262 A1 * 12/2022 Arthur ............. G05B 19/41875
2024/0257335 A1 * 8/2024 Zylstra ................... G06Q 10/20

* cited by examiner

SYSTEMS, METHODS, AND INTERFACES FOR TRACKING DEFECTS

CROSS-REFERENCE TO RELATED APPLICATIONS

The present application is a 35 U.S.C. § 371 U.S. National Stage of PCT Application No. PCT/US2022/076844 filed on Sep. 22, 2022, which claims the benefit of and priority to U.S. Provisional Patent Application No. 63/247,134, filed on Sep. 22, 2021. The entire content of each of the aforementioned patent applications is incorporated herein by reference.

BACKGROUND

1. Technical Field

The present disclosure relates to devices, computer-implemented methods, and systems for tracking defects during the painting of an automotive vehicle.

2. Background

Cars and other automotive vehicles are typically painted in steps, with each step applying a new layer of paint or other coating to the vehicle. At each step, there is a potential for defects-either in the application of the paint or other coating, or physical defects to the vehicle (such as scratching or denting). Once the vehicle has moved on to the next step, and has had a new layer applied, it is difficult to identify defects from previous steps, and even harder to fix them. Identifying the defects as they arise allows for the defects to be fixed before a vehicle moves onto the next step.

Conventional approaches involve tracking these defects manually. For example, a user might manually track defect information (such as the location of the defect, the type of defect, what layer or sublayer it is in, etc.) with a hard, paper copy. Such conventional approaches to identifying defects may be slow, partly due to limitations for entering data on a per-vehicle-basis or a per-part-basis. As the quantity of defects rises, users may need to flip through their hard copies for each defect analysis, similar to flipping through a book. This can result in loss of important context about the type, time, and location of defects, particularly repeat defects. For example, such tracking does not necessarily allow for an easy visualization of the defects, where they are and the extent of them.

BRIEF SUMMARY

The present disclosure provides systems, methods, and computer program products for efficiently and accurately identifying and tracking defects that arise in the operation of painting vehicles through a graphical user interface that allows for a display of a cumulative "heat map" of identified and tracked defects. For example, aspects of the present disclosure include computerized systems that can employ methods for displaying a modeled vehicle, alongside various vehicle attributes, containing the identified defects for one or multiple vehicles over a specified time interval. The defects can be sorted, identified, and/or grouped by type, location, where and when in the process the defect occurs, and/or other relevant defect or vehicular information. When the modeled vehicle is displayed, the variety of defects can also be displayed and easily be identified, for example, by using designated colors for each defect, where the colors correlate with such factors as frequency, type, and so forth. The variety of defects may be overlaid on the modeled vehicle like a "heat map," providing relevant context about the defect(s) identified during the interval. Such methods may be implemented, for example, in a graphical user interface application that allows the end user to drill down into displayed defects to uncover rich information about each given defect.

For example, a computer system configured to implement a method for tracking defects corresponding to application of a coating to a vehicle, may include: a display, and a processor; and a computer-readable storage media having computer-executable instructions stored thereon that, when executed, cause the computer system to perform the following method: displaying on the display a graphical user interface having a plurality of user-selectable input variables for application of a coating to a vehicle, wherein the input variables enable user entry of data corresponding to (i) a vehicle identifier that identifies a set of one or more vehicles being coated, and (ii) a type of coating to be applied: receiving a process variable, wherein the process variable corresponds to a physical parameter of applying the coating on the one or more vehicles being coated; displaying an output variable via the graphical user interface, wherein the output variable allows the user to indicate user-observed characteristics of the coating as applied to the one or more vehicles over a time interval; receiving from the user an identification of a defect on any of the one or more vehicles during a coating process, wherein the defect is associated with a color; and displaying, via the graphical user interface, a heat map over a modeled vehicle representing the set of one or more vehicles observed by the user over the time interval, wherein the heat map displays the defect in the associated color.

In addition, a computer-implemented method for tracking user-observed defects through a computer system can include: displaying on a digital display of the computer system a graphical user interface showing a model of a vehicle being coated with a coating, wherein the displayed vehicle is a model corresponding to a set of one or more vehicles undergoing a coating process over a time interval; receiving, through the graphical user interface, one or more initial user inputs directed to an area of the image of the vehicle where a defect in a paint layer on any one of the one or more vehicles in the set is observed by the user after an initial layer of the coating has been applied to any vehicle in the set, and receiving user input that characterizes each observed defect as being of a particular type; receiving one or more additional user inputs related to one or more user-observed defects after application of a further layer of the coating, and receiving one or more subsequent user inputs that characterizes each observed defect in the next layer as being a defect of a particular type; displaying a modifiable view of the vehicle model showing each user-identified defect overlayed thereon, and with a different color that corresponds to each different type of defect; and providing a plurality of image modifiers that enable the user to provide input through the graphical user interface, wherein, in response to the input, the computer system adjusts one or more of an intensity, color, and radius of each identified defect to reflect at least a frequency of the observed defect in the set during the time interval.

Furthermore, a computer system configured to implement a method for tracking defects corresponding to application of a coating to a vehicle can include: a display, and a processor; and a computer-readable storage media having computer-executable instructions stored thereon that, when executed, cause the computer system to perform the following method: displaying on the display a graphical user interface having a plurality of user-selectable input variables for application of a coating to a vehicle, wherein the input variables enable user entry of data corresponding to (i) a vehicle identifier that identifies a set of a plurality of vehicles being coated, and (ii) a type of coating to be applied; receiving a process variable, wherein the process variable corresponds to a physical parameter of applying the coating on the one or more vehicles being coated; displaying an output variable via the graphical user interface, wherein the output variable allows the user to indicate user-observed characteristics of the coating as applied to the set of vehicles over a time interval; receiving from the user an identification of a defect status on any of the vehicles in the set during a coating process; and displaying, via the graphical user interface, a heat map over a modeled vehicle representing the set of one or more vehicles observed by the end-user over the time interval, wherein the heat map displays a defect status that is representative of an accumulation of user defect observations for the set of vehicles in the time interval.

Additional features and advantages will be set forth in the description that follows. The features and advantages may be realized and obtained by means of the instruments and combinations particularly pointed out in the appended claims. These and other features will become more fully apparent from the following description and appended claims, or may be learned by the practice of the examples as set forth hereinafter.

BRIEF DESCRIPTION OF THE DRAWINGS

To describe the manner in which the above recited and other advantages and features can be obtained, a more particular description briefly described above will be rendered by reference to specific examples thereof, which are illustrated in the appended drawings. Understanding that these drawings are merely illustrative and are not therefore to be considered to be limiting of its scope, the present disclosure will be described and explained with additional specificity and detail through the use of the accompanying drawings in which.

DETAILED DESCRIPTION

Figure 1A:
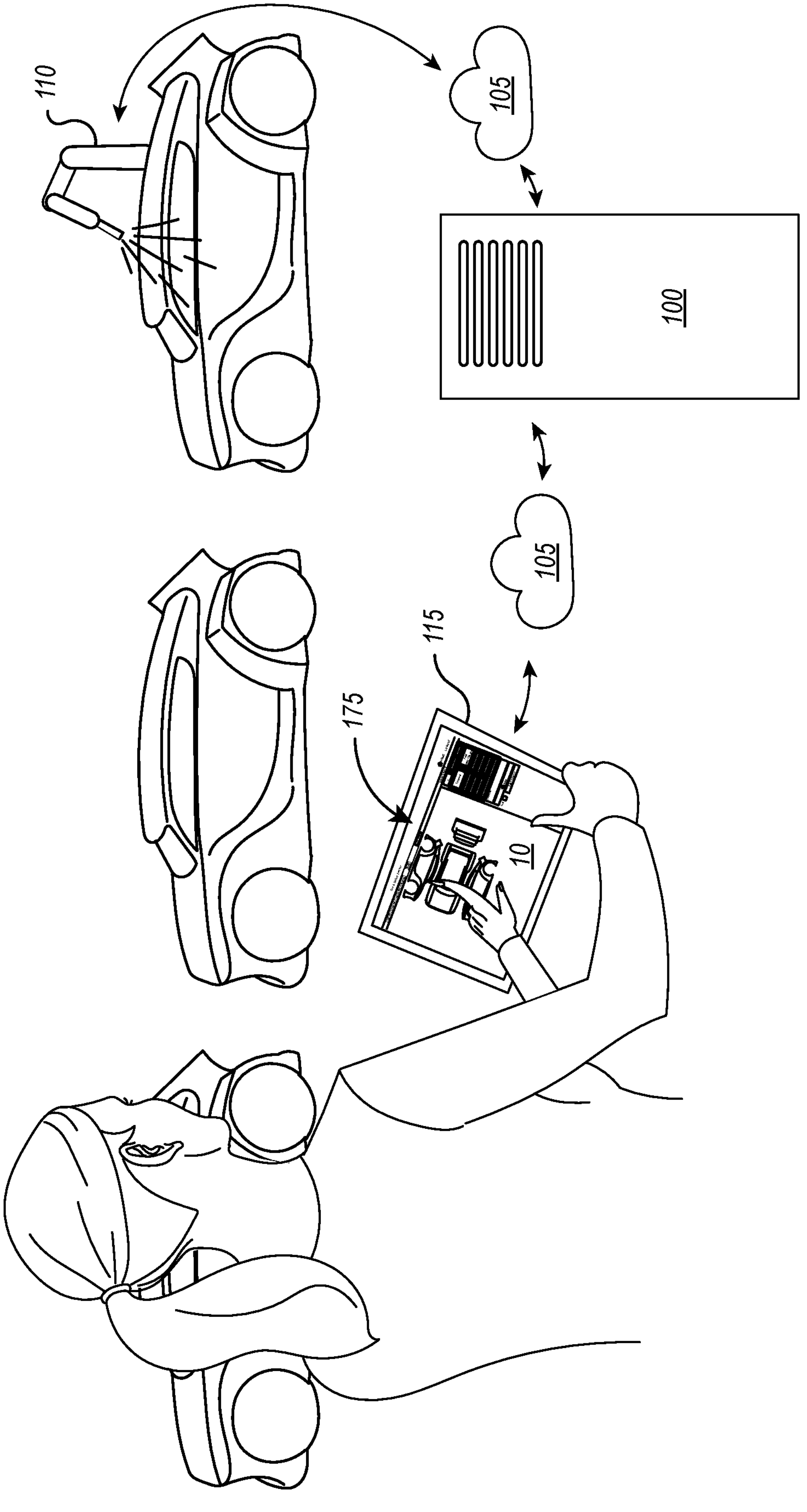
FIG. 1A illustrates an overview of a system for monitoring output quality in a vehicle coating and/or painting process.

The present disclosure provides systems, methods, and computer program products for efficiently and accurately identifying and tracking defects that arise in the operation of painting vehicles through a graphical user interface that allows for a display of a cumulative "heat map" of identified and tracked defects. For example, aspects of the present disclosure include computerized systems that can employ methods for displaying a modeled vehicle, alongside various vehicle attributes, containing the identified defects for one or multiple vehicles over a specified time interval. The defects can be sorted, identified, and/or grouped by type, location, where and when in the process the defect occurs, and/or other relevant defect or vehicular information. When the modeled vehicle is displayed, the variety of defects can also be displayed and easily be identified, for example, by using designated colors for each defect, where the colors correlate with such factors as frequency, type, and so forth. The variety of defects may be overlaid on the modeled vehicle like a "heat map," providing relevant context about the defect(s) identified during the interval. Such methods may be implemented, for example, in a graphical user interface application that allows the end user to drill down into displayed defects to uncover rich information about each given defect.

One will appreciate, in view of the specification and claims herein, that examples of the present disclosure can provide benefits to end users, such as operators of an asset paint facility (e.g., automotive paint shop) for OEM painting on an assembly line or auto-body refinish, or technicians working within the asset paint facility. Such benefits can include improved and more efficient defect tracking across the entire process of painting an automotive vehicle or parts, providing accurate, resolvable, and nearly instantaneous views of defect accrual enabling ready and accurate responses to resolve such problems. Moreover, end users such as asset paint operators and even the end customer can gain confidence that defects identified and tracked through a graphical user interface will be eliminated or identified for repair in the finished product, and ensure that future processes are better able to identify and omit repeat errors from prior processes. Exemplary benefits can further include improved and more efficient tracking of defects across multiple vehicles or parts, as well as tracking when and where in the painting operation the defects are occurring. This can allow for the identification of patterns and areas of defect concentration common to vehicles, parts, step of operation, or variations thereof, again to ensure more accurate and prompt corrective measures.

Along these lines, embodiments of the present disclosure can beneficially improve the yield of painted or coated vehicles or assets. In some cases, the yield is improved by an average of 5%, which can translate into significant cost savings. Similarly, the present disclosure may beneficially reduce the number of vehicles or assets that may require off-line repair by approximately 75% in some cases. The present disclosure also may beneficially reduce warranty costs in paint or other coating costs by approximately 50%. In some cases, this can translate into millions of dollars in cost savings or cost reductions for certain types of entities. Also beneficially, the present disclosure can reduce water usage per vehicle or asset being painted or coated by approximately 20% due to the ability to manage waste through better error management and correction. In some cases, this reduction in water use per vehicle or asset could translate into significant environmental savings.

Referring now to the Figures. FIG. 1A illustrates an overview of a system for monitoring output quality in a vehicle coating and/or painting process. For example, FIG. 1A shows that an end user is using a personal computing system 115 on which an application 175 is open to reveal a graphical user interface 10. The personal computing system 115 may comprise a mobile device such as a mobile phone, laptop, or tablet computing system, or even a conventional desktop computing system. FIG. 1A shows that the computing system 115 is connected over a network connection 105 to any one or more server computing systems 100, which may store (via one or more storage mediums) and process user input. Personal computing system 115 may also include various storage for including computer-executable instructions for executing application 175, and/or may execute or access application 175 from a network, such that interface 10 reflects data provided from a server-hosted application, such as system 100. FIG. 1A further shows that the user is observing one or more vehicles being processed in a painting/coating environment, such as via coating/painting machinery 110. In at least some cases, the machinery 110 may comprise paint robotics, cameras, barometers, thermometers, atomizers, ovens, or other processing instruments, and may pass data to one of the computing systems 100 (or even directly to the personal computing system 115) over network 100.

By way of explanation, and as used herein, the definite articles "a" and "an" will be understood interchangeably in the singular or plural. That is, unless expressly stated to the contrary, the terms "a" or "an," particularly as recited in the claims, will be understood to mean "one or more," and "at least one" as applicable.

Figure 1B:
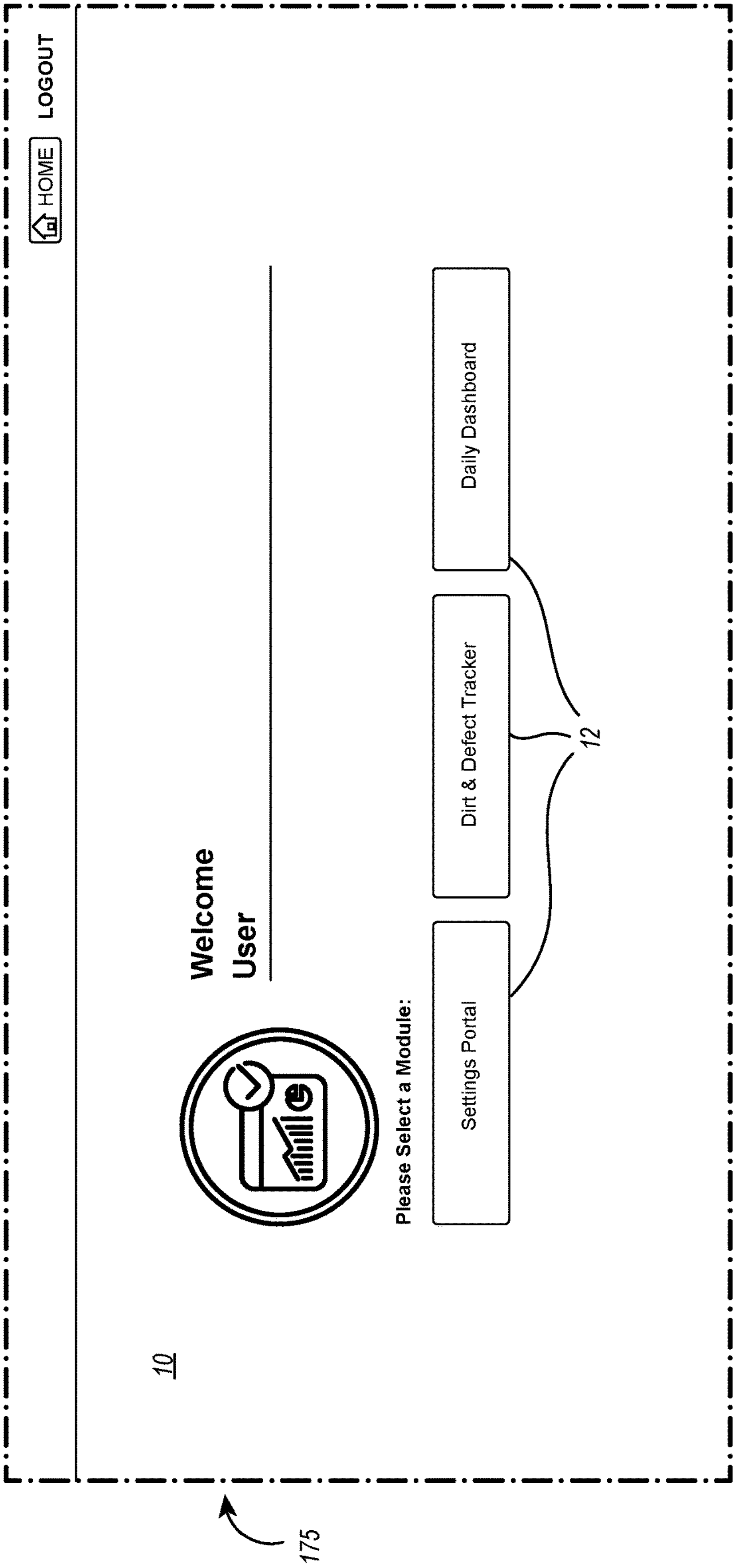
FIG. 1B illustrates a "Welcome Dashboard" displayed on an application for tracking defects.

In addition, and as will also be understood more fully from the following specification and claims, when the user endeavors to enter observations of paint/coating quality with respect to one or more vehicles, the user can open application 175 and interact with the graphical user interface 10. For example, FIG. 1B illustrates the graphical user interface 10 showing an exemplary "Welcome Dashboard" displayed on a computer-implemented application 175 for tracking defects. FIG. 1B further shows that the graphical user interface 10 can be configured to display three selectable modules 12 that enable the user to follow various avenues or workflows for data entry and collection. A user may select any one of the modules while conducting a defect tracking process. For example, FIG. 1B shows that the graphical user interface 10 is displaying the modules 12. "Settings Portal" (or Customer Support/Service Portal), "Dirt & Defect Tracking." and "Daily Dashboard." One will appreciate that the graphical user interface 10 may include more than three modules 12, such as four, five or six modules 12.

The application 175 can be configured for internet connection, or a stand-alone application that iteratively syncs with a network or remote storage resource or server when connectivity is available. The user may run the application 175 on a tablet, mobile or any suitable digital device. Accordingly, the network 100 shown in FIG. 1A may comprise a local, wide, or global/Internet network connection.

In addition, as disclosed herein, the present disclosure can enable input (e.g., by an end user) of "input variables." "process variables." and "output variables" relative to a paint process of an asset, as well as to provide identification information regarding at least one defect of the applied paint. As used herein, the term "input variables" includes data related to a vehicle or set of one or more vehicles being coated or painted, as well as data about the coating being applied, such as the brand or type of base, primer, top-coat, or other layers, and their respective colors and compositions. "Input variables" can include a viscosity (e.g., of the paint or coating), a roughness, a conductivity, % NV, P/B, LSV, other appropriate vehicle variables, and/or combinations thereof. In addition, the term "process variables" refers to data corresponding to physical or environmental parameters relevant to the physical coating/painting process.

"Process variables" can include temperature, humidity, air flow, bell speeds, bell split, fluid flow, ramp profiles, other variables pertaining to the operation of the painting or coating process, and/or combinations thereof. For example, the computer system providing the graphical user interface may pull the data from one or more wired or wireless connections to the network 100 with robotic instruments 110 that applied the coating, or may retrieve the data from user input. Furthermore, "output variables" relate to user-observations for coating quality or defect in relation to user observations of the vehicle or set of vehicles that have passed through or are otherwise passing through a coating/painting process. "Output variables" can include user or machine-identified qualitative assessments of appearance, color, dirt count, film builds, hardness, surface tension, gloss, other variables regarding detected and/or corrected defects, and/or combinations thereof. The relationship of each of these types of variables to the ultimate display in application 175 will be understood more fully from the following specification and claims herein.

Figure 2:
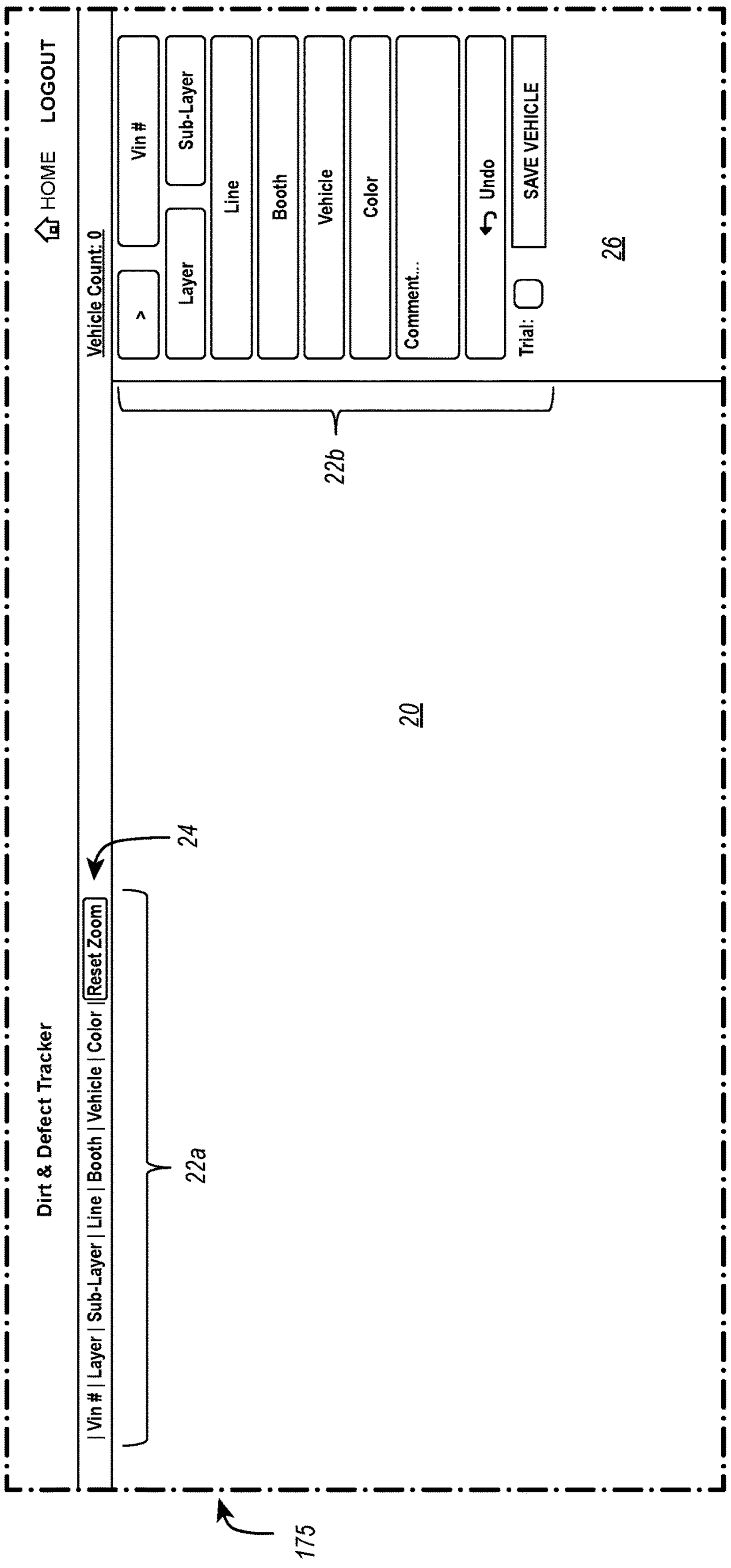
FIG. 2 illustrates a defect tracker dashboard displayed on the application for tracking defects.

For example, FIG. 2 illustrates an example in which the user has selected the "Dirt and Defect Tracker" from the initial modules 12 shown in FIG. 1B. As shown, the defect tracker interface can include a general interface 20 (also referred to as a dashboard 20) and can include a plurality of selectable options 22*a* in a top selection bar 24. The selectable options 22*a* enable inputting of various input variables (e.g., VIN or other vehicle identifiers for a set of one or more vehicles being processed, coating color or type, coating line, booth, etc.). Selectable options 22*a* can additionally or alternatively be shown as selectable options 22*b* nested in a side menu 26.

In general, the interface 20 can be configured for dynamic engagement with a user. In at least one example, a user may select any one of the plurality of selectable inputs 22*a*. 22*b* when inputting variable inputs such as vehicle metadata or codes for a particular primer, base coat, clear coat, or other layer being applied. Each selection made by an end user can be synced to a central resource (e.g., a server, cloud server, or cloud storage) and coordinated with inputs from other users accessing the interface 20. Thus, the interface 20 can be accessed simultaneously and across multiple, different devices in a way that manages and synchronizes input across multiple users, while nevertheless providing each user with an individualized user interface experience.

Figure 3A:
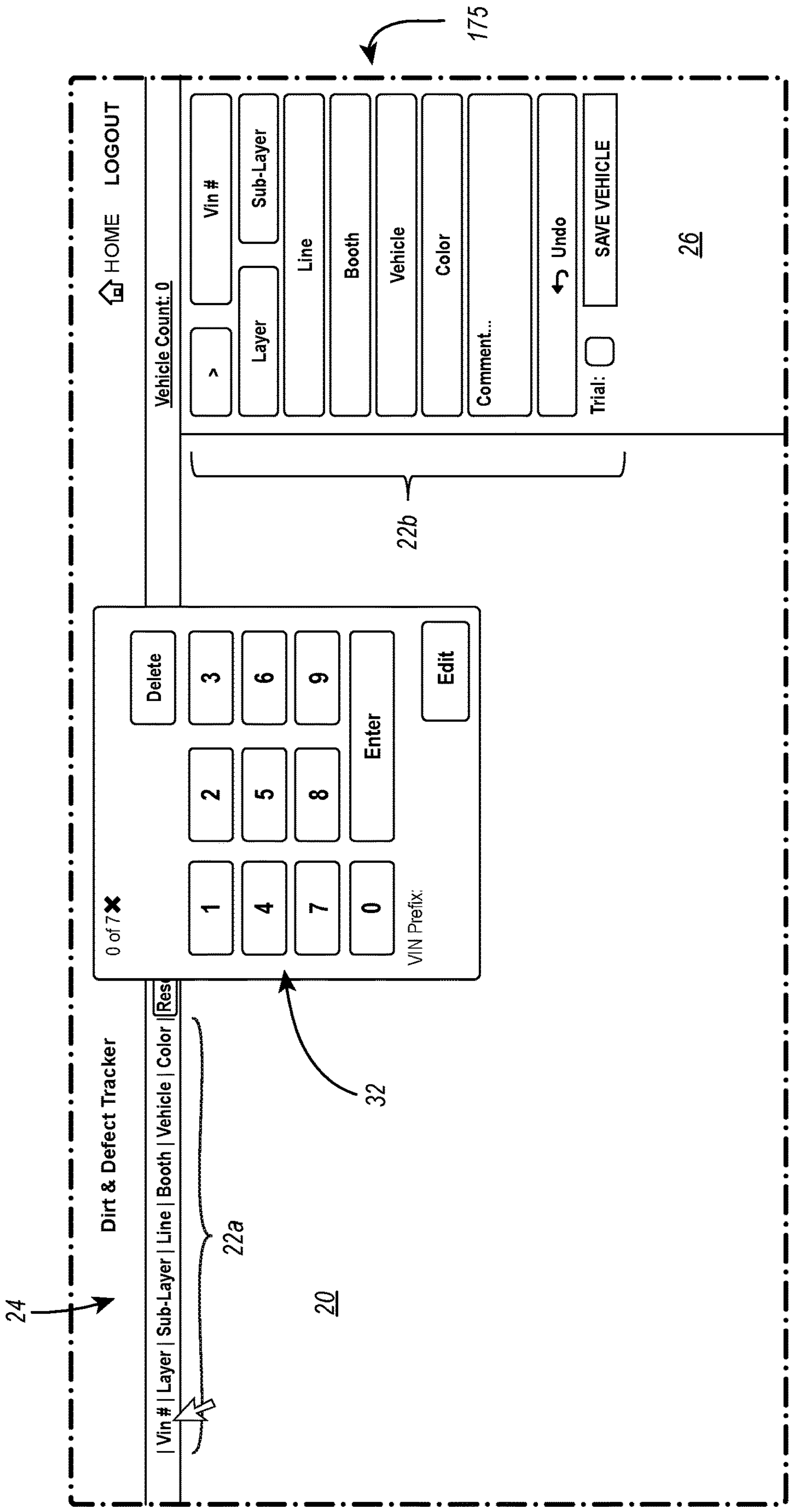
FIG. 3A illustrates a first input screen displayed on the application for tracking defects.
Figure 3B:
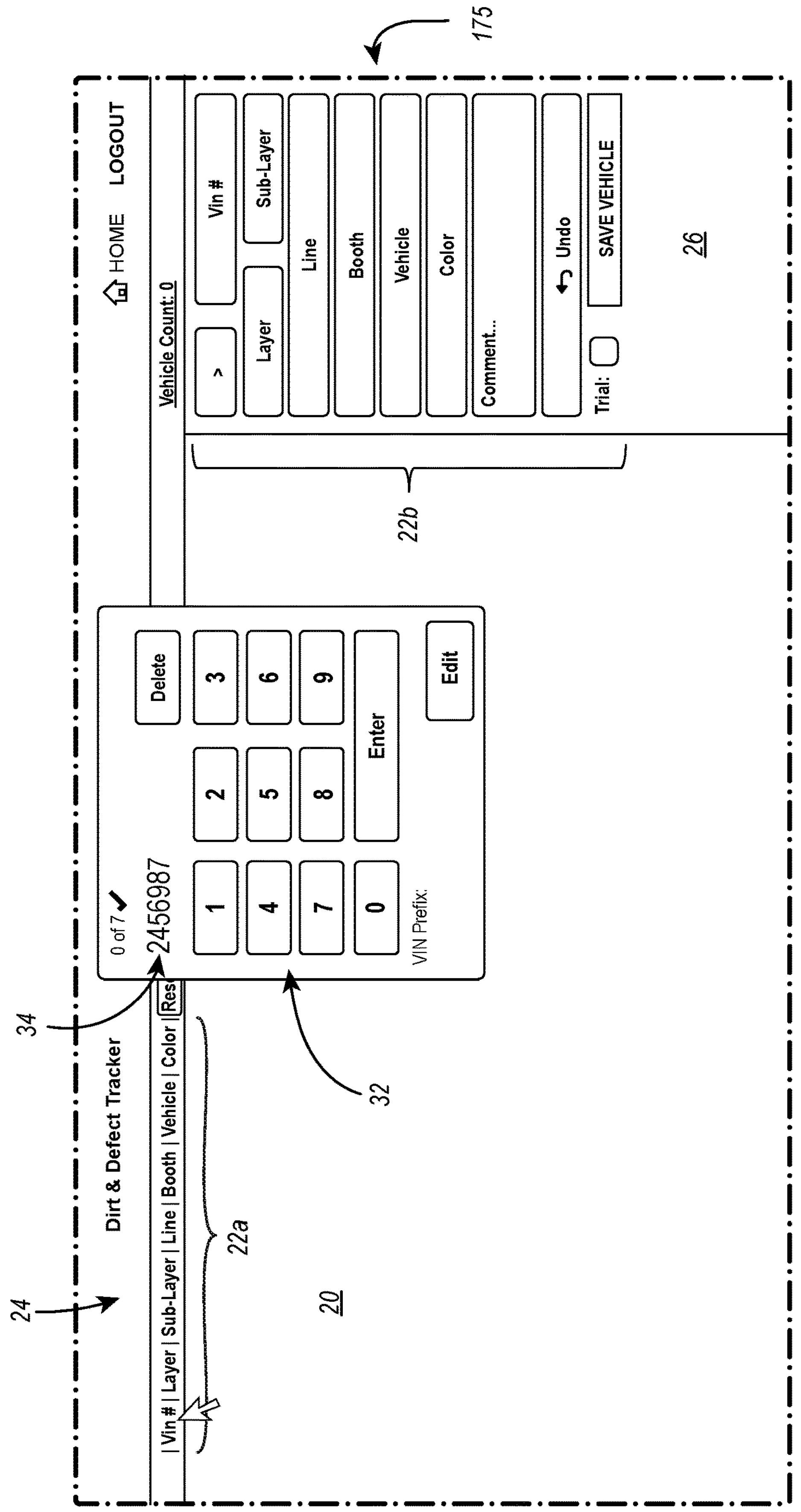
FIG. 3B illustrates the first input screen containing a numerical input displayed on the application for tracking defects.

For example, FIGS. 3A-3B illustrate how an end user may begin to access and provide input variables through interface 20. FIG. 3A illustrates that in response to an end user selecting the "Vin #" selector of inputs 22*a*, application 175 presents a dialog box 32, which in this case can include a keypad that enables the user to enter information such as a VIN number, or a vehicle identifier that may be representative of a set of one or more vehicles. The vehicle identifier entered forms part of a particular vehicle's (or set of one or more vehicle's) vehicle metadata. As shown in FIG. 3B, the end user enters a vehicle (or vehicle set) identifier of 2456987, which will then be displayed in the side menu 26.

Figure 4A:
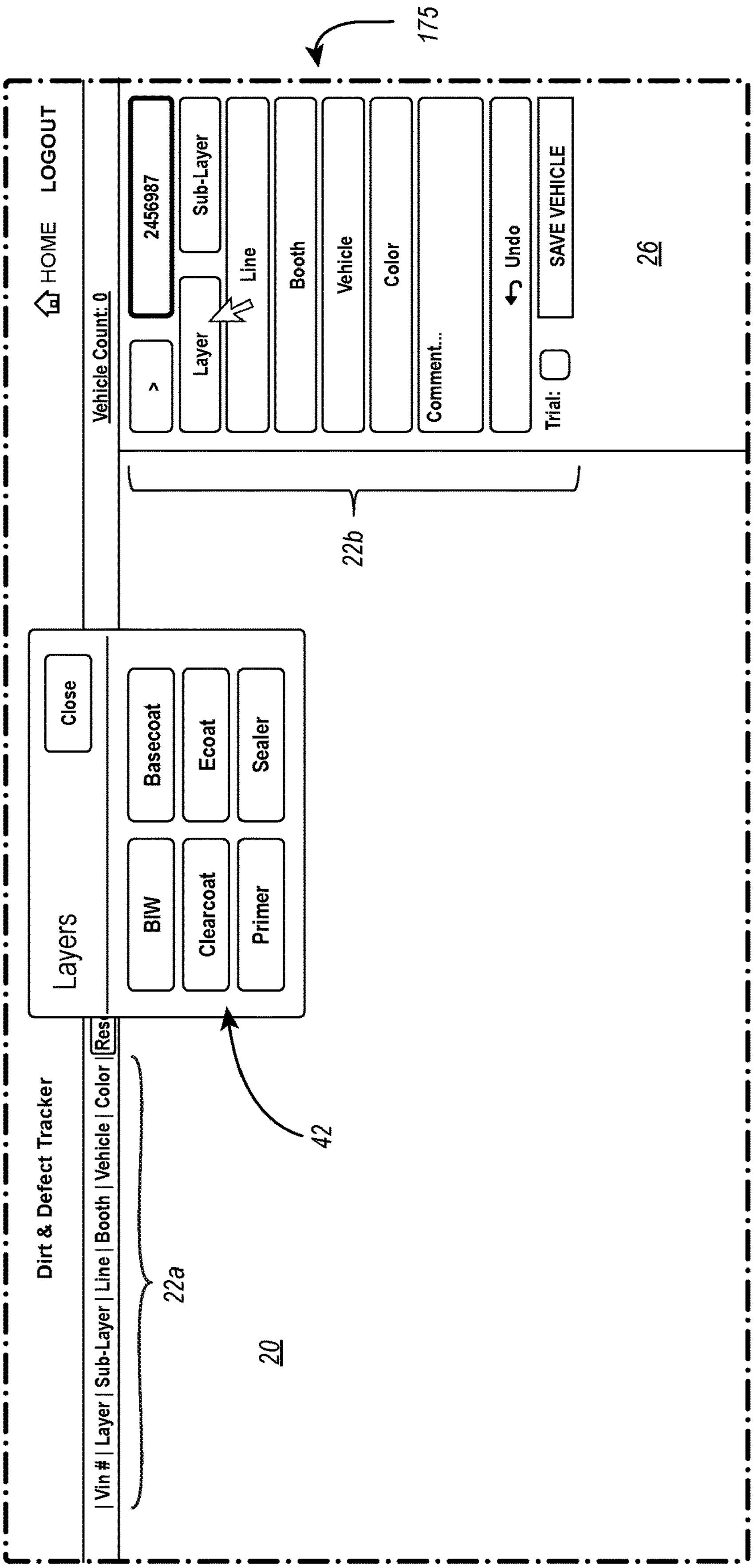
FIG. 4A illustrates a layer selection screen displayed on the application for tracking defects.

FIG. 4A illustrates the user has further selected the "Layer" menu option and in response a layer selection screen 42 is displayed on the application 175 for tracking defects. In at least one example, the layer selection screen 42 overlays the interface 20 (FIG. 2). As with the first input screen 30, the layer selection screen 42 enables the user to indicate a particular layer of the coating process being observed. For example, the operator (not shown) may be observing a vehicle or set of one or more vehicles being coated in a shop or assembly line, and in advance of providing output variables related to observed defects or other observations, the user selects the layer that is currently being painted. Thus, any selections regarding quality or defect made at this stage will be directly correlated and may be filtered in or out of view by association with the selected layer. In this case, the user has several options from which to choose in the layer selection screen 42, including BIW. Basecoat, Clearcoat, Ecoat. Primer, Sealer, etc. One will appreciate that the observed quality and/or defect(s) can be associated not only with a specific coating application layer, but also a specific moment in time of an interval in which several vehicles in the coating process are observed (e.g., in a coating process of an assembly line).

Figure 4B:
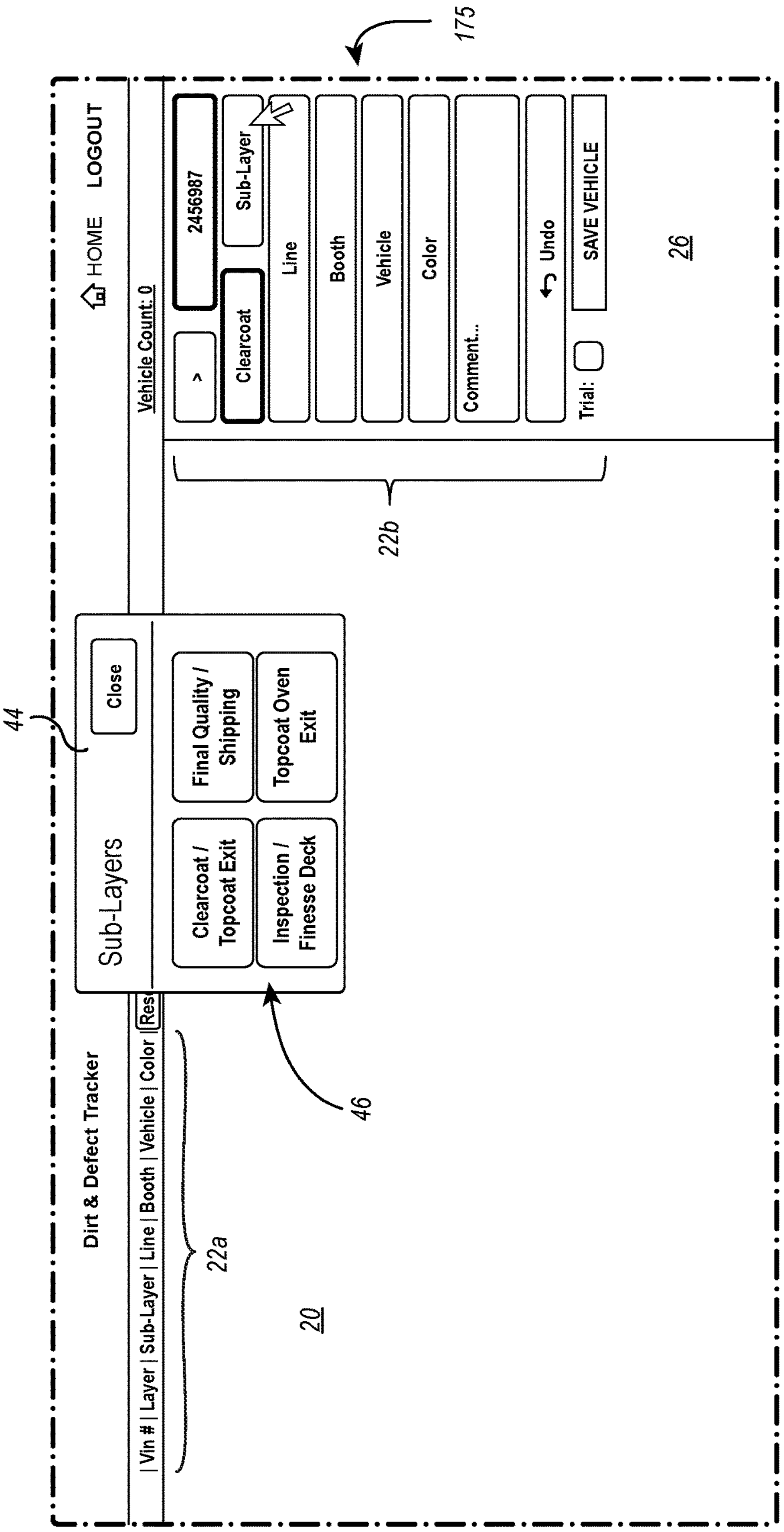
FIG. 4B illustrates a sub-layer selection screen displayed on the application for tracking defects.

Similar to FIG. 4A, FIG. 4B illustrates that the user has selected a sub-layer option from selectable inputs 22*b*, which prompts screen 46 displayed by the application 175. In at least one example, the sub-layer selection screen 44 and selectable buttons 46 can be provided to the user immediately after selecting a layer from the layer selection screen 44 (shown in FIG. 4A). FIG. 4B shows that the selectable options in dialog 46 include Clearcoat/Topcoat Exit. Final Quality/Shipping, Inspection/Finesse Deck, and Topcoat Oven Exit. As with the layer options shown in FIG. 4A, the selectable items of dialog box 46 similarly enable the user to associate qualitative user observations and other data with specific sub-layers as they are observed. This helps provide further contextual information about the vehicle or coating process being observed.

Figure 15:
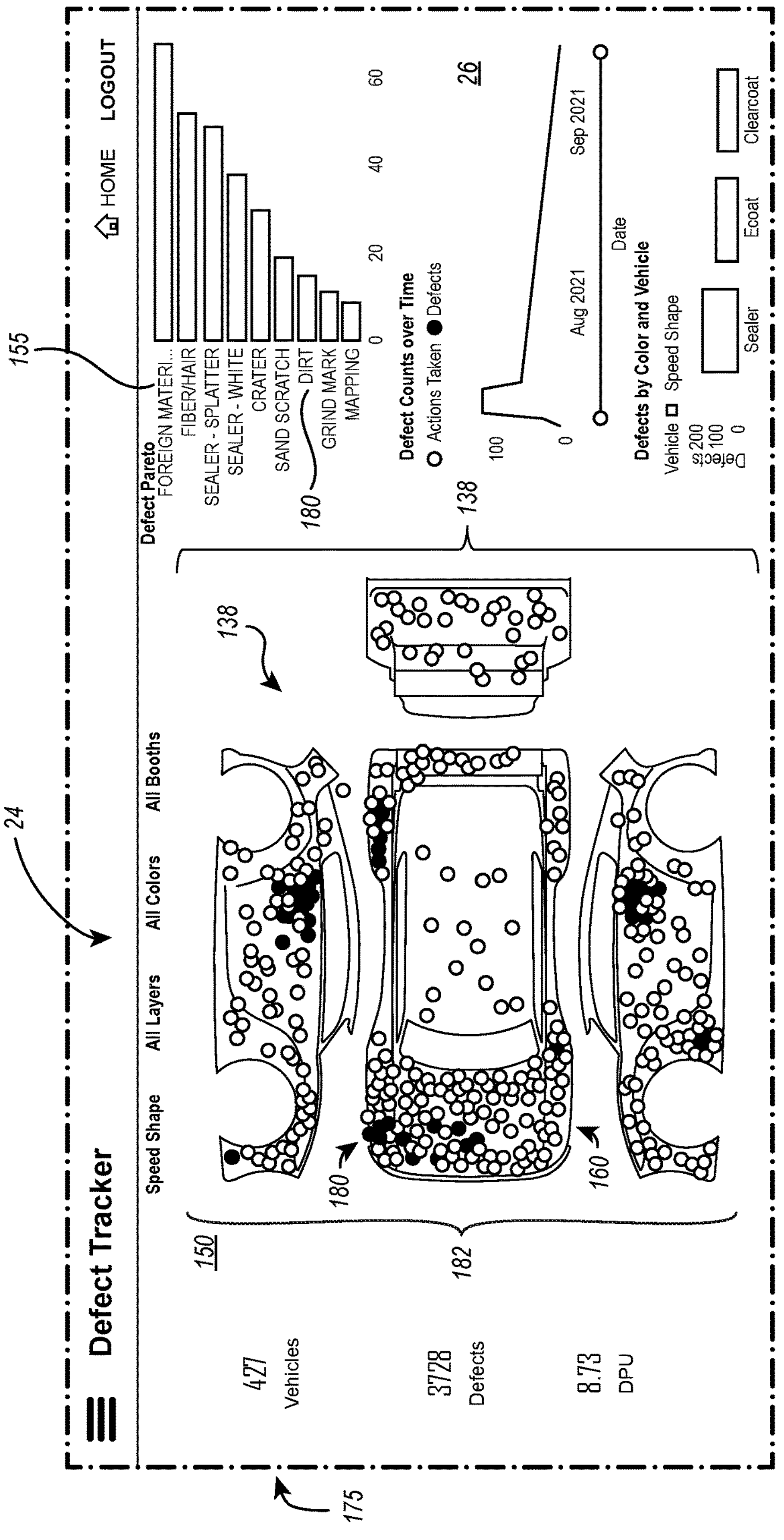
FIG. 15 illustrates the heat map of FIGS. 8-13 after the accumulation of multiple defects over a time interval for a single or multiple vehicles in a set.

By way of explanation, application 175 can be configured for both local and cloud storage. In at least one example, the entered layer or sub-layer information can be saved locally on the application 175 as part of a defect tracking process (FIG. 15). The entered information can be saved whether or not the application 175 is connected to the internet. The application 175 can be configured to upload the information that has been saved locally to a cloud when a network connection becomes available. As discussed herein, the application 175 can comprise any number or types of applications that may be used and interacted with, for example, on a mobile device, such as a mobile phone, tablet computer, laptop, or other portable digital device with an interactive display screen, including smart glasses, or the like. Thus, in one embodiment, the application 175 can comprise a locally installed, stand-alone application, a web-browser application that is opened, loaded through, and interacted with via a locally installed web-browser, a cloud-based/web-hosted application, and so forth. However configured, instances of the application 175 generally include the user's ability to directly interact with a touch screen or similar input for visual interaction with representations of the target object being painted, and the ability to point-select areas for markup or representing defects, etc.

Figure 5:
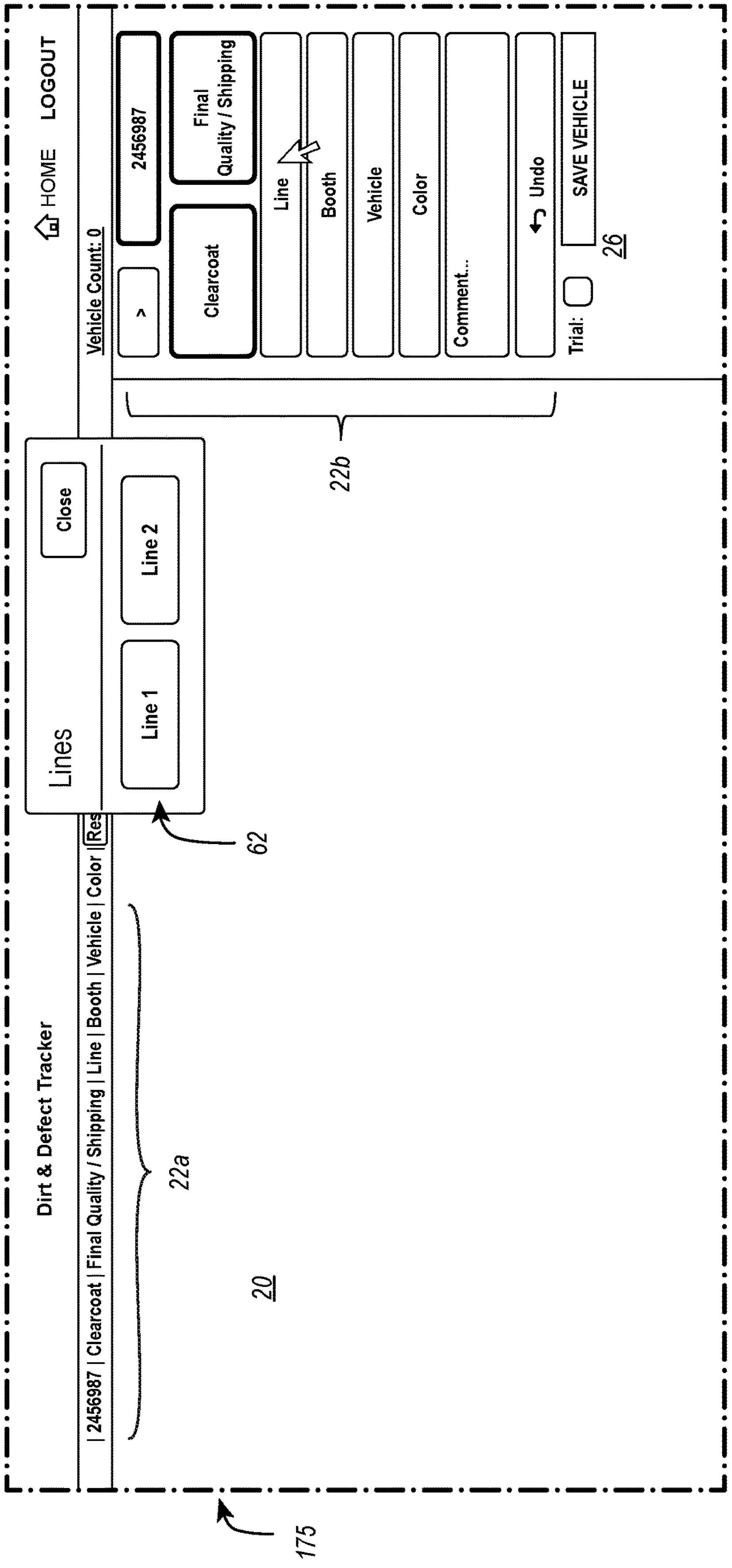
FIG. 5 illustrates a line selection screen displayed on the application for tracking defects.

Examples of the present disclosure may allow the interface 20 to display values for vehicle metadata such as a VIN number, a vehicle type, a color of the vehicle, etc. For example, FIG. 5 shows the VIN number "2456987" in the side menu 26 in the upper right-hand corner. In addition, the plurality of selectable inputs 22*a*, 22*b* may include values for defect metadata such as defect type, where on the vehicle the defect is located, in what layer the defect is located, etc. One will appreciate that one or more dashboards 20 may be accessed by one or more users simultaneously and across multiple, different devices. Hence, the interface 20 can represent inputs simultaneously from different users at different locations.

The application 175 may save the displayed values of the plurality of selectable inputs 22*a*. 22*b* locally as part of a defect tracking process (FIG. 15). The application 175 may save the displayed values of the plurality of selectable inputs 22*a*. 22*b* regardless of whether there is internet connectivity. The application 175 can further upload the particular values that have been saved locally to a cloud, or to another appropriate server, when there is internet connectivity during the defect tracking process (e.g., as FIG. 15).

FIG. 5 illustrates that, in response to user selection of the selectable "Line" component of selectable elements 22*b*, the application 175 displays a selectable Line dialog box 62. The line selection dialog box 62 enables the end user to designate which particular line is being observed. Naturally, the number of available lines may be configurable to the size of the plant where paint processes occur. In any event, all user observations made about the quality of a particular paint layer and/or number or type of defects will be associated by the computer system with the line in which the observation occurred.

Figure 6:
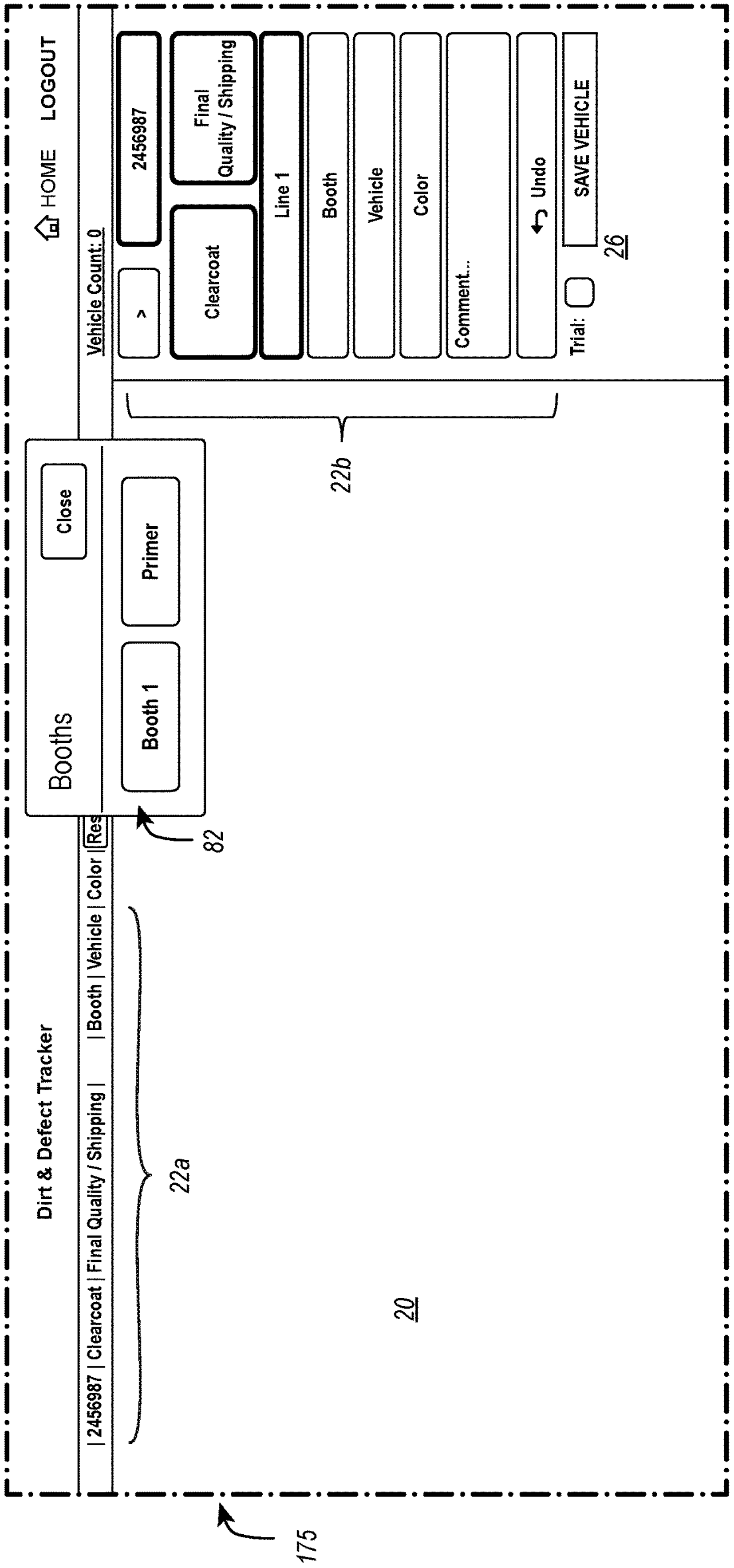
FIG. 6 illustrates a booth selection screen displayed on the application for tracking defects.

Similar to FIG. 5. FIG. 6 illustrates that, in response to user selection of the selectable "Booth" component of selectable elements 22*b*, the application 175 displays a selectable Booth dialog box 82. The booth selection dialog box 82 enables the end user to designate which particular booth is being used for the coating process, and further allows selection of primer. Naturally, the number of available booths and primers listed may be configurable to the size of the plant or operations where paint/coating processes occur. In any event, all user observations made about the quality of a particular paint layer and/or number or type of defects will be associated by the computer system with the designated Booth and primer. A user can then select the relevant button of the dialog box 82 (e.g., via direct touch of the screen, selection via an input device, etc.) to enter the information that is relevant to the particular asset being painted.

Figure 7:
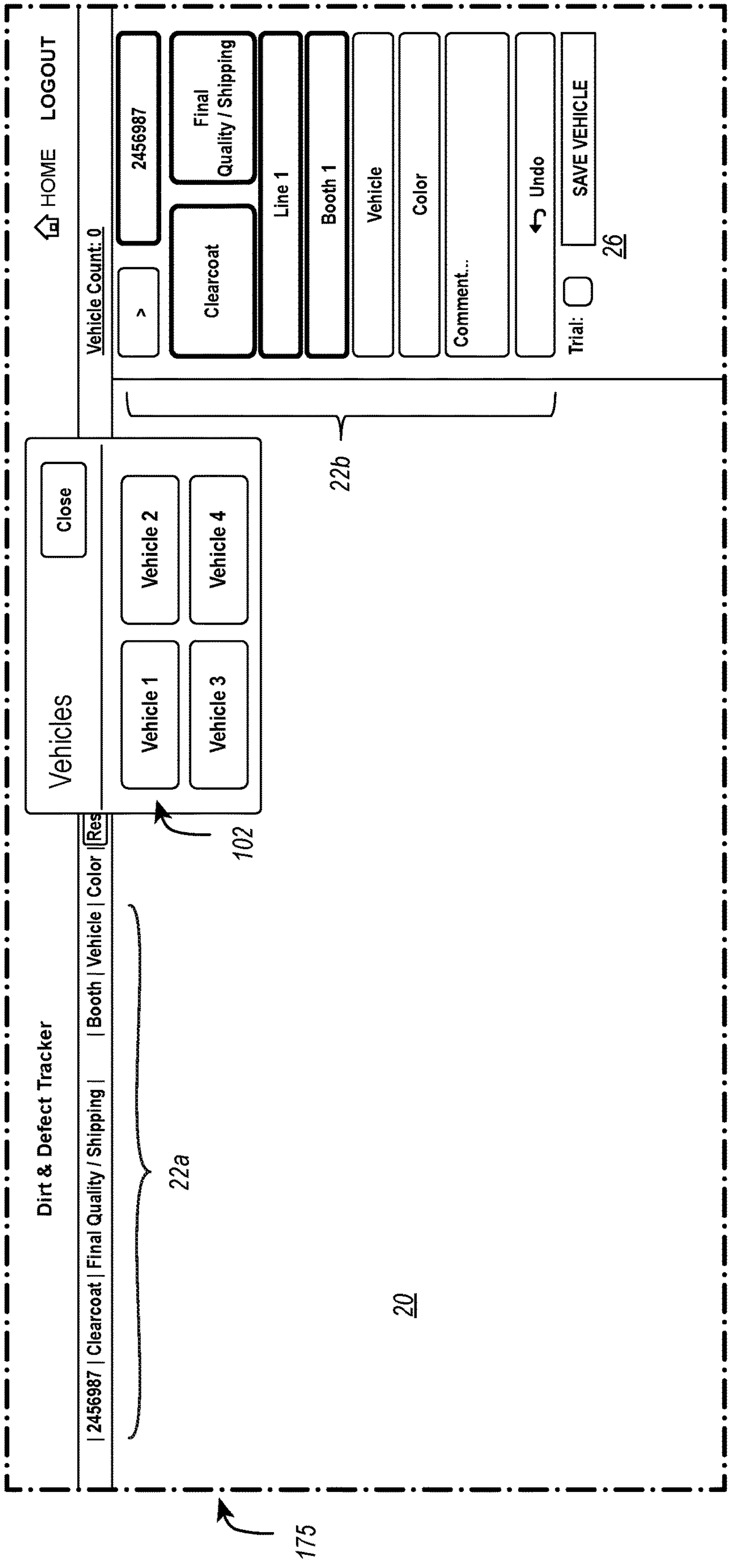
FIG. 7 illustrates a vehicle selection screen displayed on the application for tracking defects.

Similar to FIGS. 5-6. FIG. 7 illustrates that, in response to user selection of the selectable "Vehicle" component of selectable elements 22*b*, the application 175 displays a selectable Vehicles dialog box 102 over interface 20. The Vehicles selection dialog box 102 enables the end user to designate which particular vehicle or vehicle type is being observed for the coating process. Naturally, the number of available vehicles or vehicle lines may be listed and all subsequent user observations made about the quality of a particular paint layer and/or number or type of defects on the vehicle or set of one or more vehicles will be associated by the computer system with the then selected Vehicle 1, Vehicle 2, etc. As before, the application 175 may save the displayed and selected values of the plurality of selectable inputs 22*a*. 22*b* locally as part of a defect tracking process. Furthermore, as can be seen for example in FIGS. 3A through 8, the selectable menu items 22*a*, 22*b* are continually updated to reflect the user selections. Thus, for example, FIG. 8 illustrates that menu items 22*a*. 22*b* illustrate the entered VIN or vehicle set identifier, that the coating layer is clearcoat, and that the observation point is in final quality/shipping.

Figure 8:
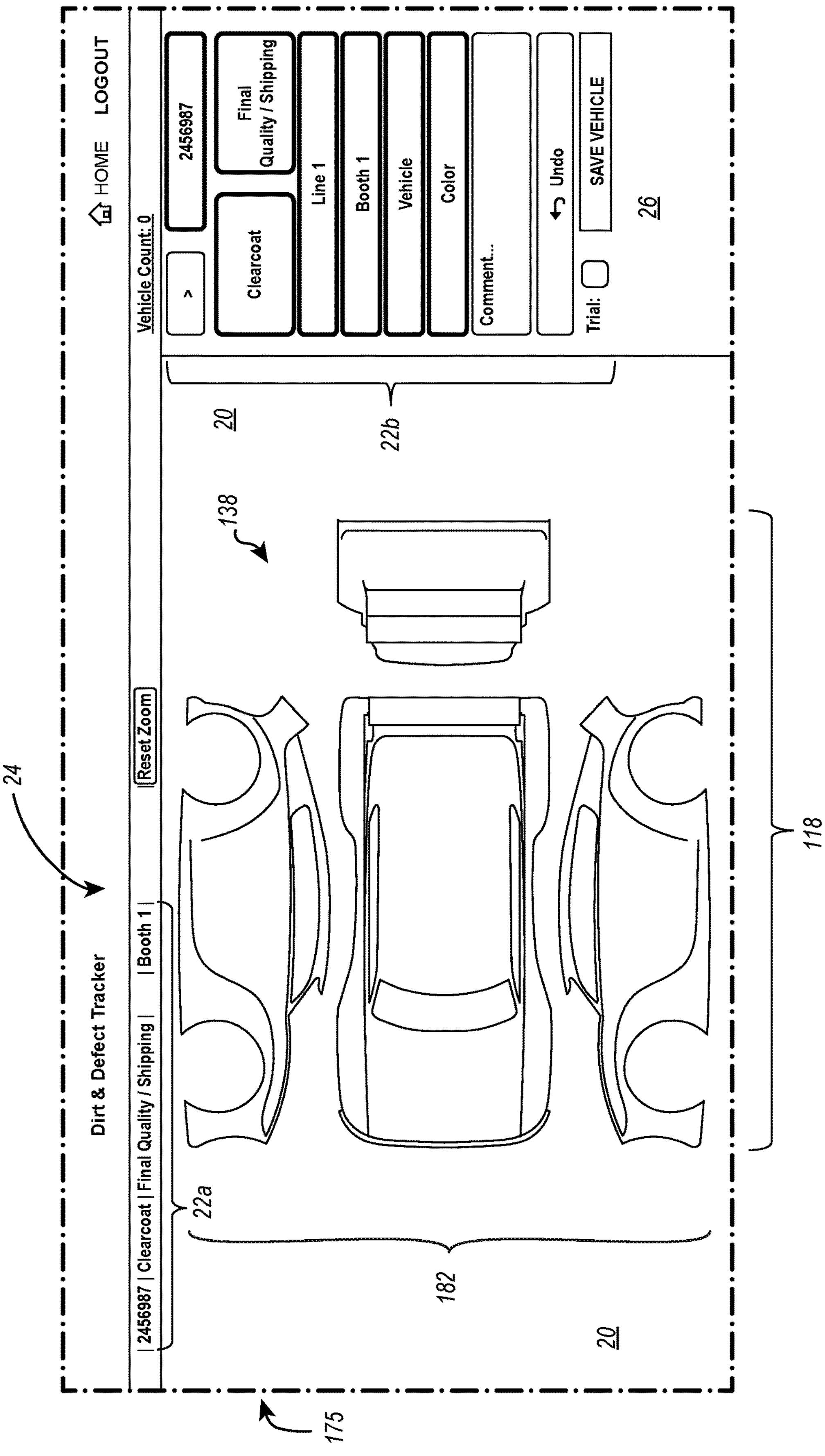
FIG. 8 illustrates a model of a selected vehicle displayed on the application for tracking defects as a heat map.

In addition, FIG. 8 illustrates that interface 20 can be selected to provide an exemplary vehicle selection screen for tracking defects, in particular by showing the beginning of a "heat map." As understood more fully herein, the "heat map" comprises a model vehicle 138 that is representative of a vehicle or set of vehicles being painted/coated in a coating process. The heat map generally relays the number (or lack thereof) of observed defects. In most cases, the observed defects will be user-observed defects; however, one or more computer systems may also be employed to automatically identify and apply defects. As understood more fully from the following specification and claims, the heat map will include various accumulations of one or more defects observed during a painting process, expressed as color-differentiable dots of certain sizes and color intensities. In general, the computer system disclosed herein (or as assigned by the user) will associate dots associated with types of defects with one color, and may further modify the representation (e.g., the color, the color intensity, or other visible or audible indicia associated with the illustrated dot) depending on other output variables, such as the frequency of observation of such defects in a particular area of a representative vehicle.

Figure 9:
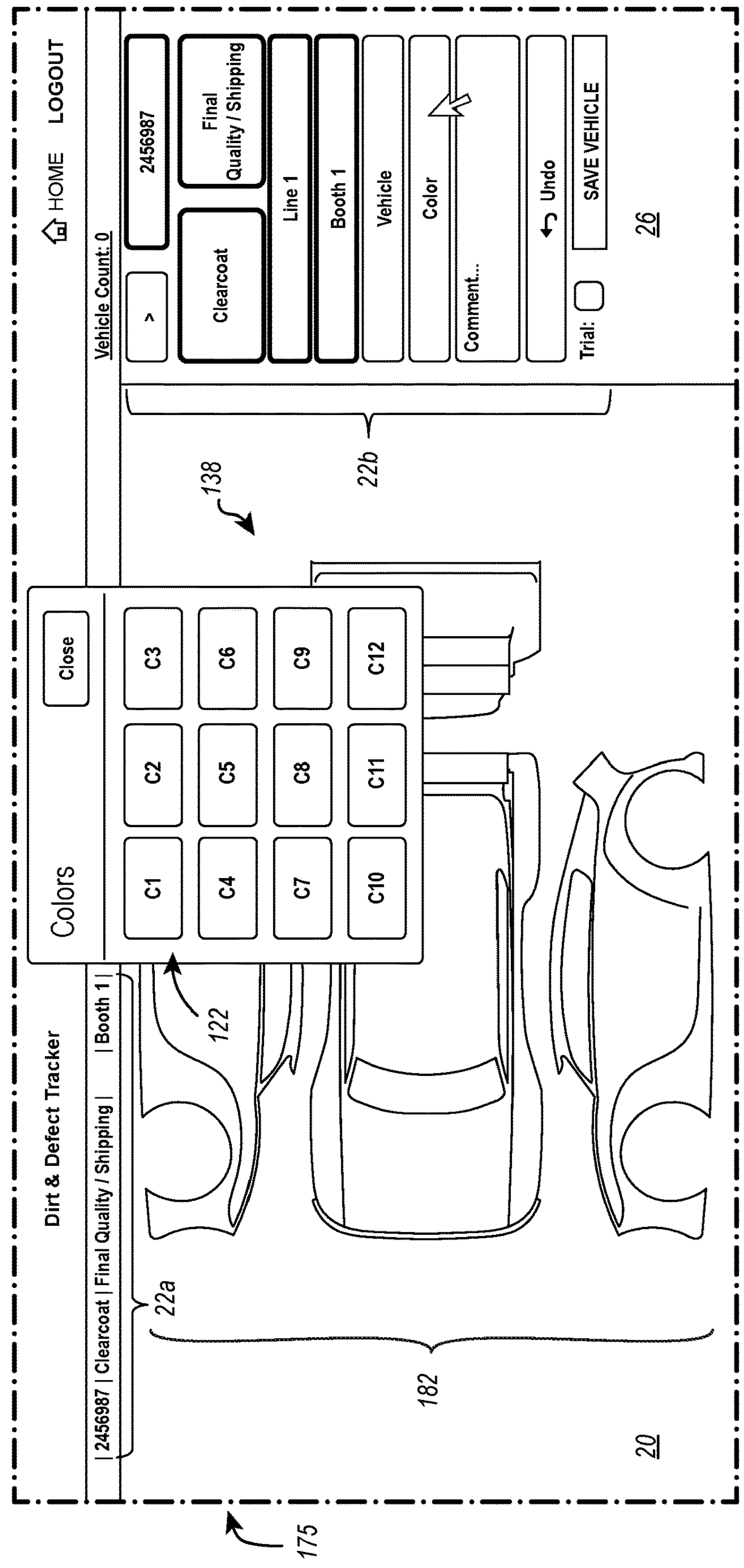
FIG. 9 illustrates a color selection screen displayed on the application for tracking defects.

FIG. 9 illustrates the model vehicle 138 in exploded, planar view; however, this is not required, and the vehicle model can be shown in a rotatable 3D format. Moreover, it is not necessary that the model vehicle directly represent the exact vehicle being painted, though such is possible in context of the present disclosure. The model vehicle 138 essentially provides a heat map (or a background thereto) as a user iteratively applies identified defects to the model vehicle 138 surface, and characterizes the defects by certain color code and other indicia understood more fully below. Specifically, and as will be understood more fully herein from the following specification and claims, the user can directly tap locations on the vehicle to place a marker that represents an observed defect. The user can further select the marker to add important details about the observed defect, and even select the marker to eliminate or move the marker, as needed.

Pursuant to initiating the defect marking process, FIG. 9 illustrates that the user can also select a color code for the coating that is being applied. For example, while observing a vehicle passing through an observation point after at least one layer of coating has been applied, the user can select a color option through one of the selectable inputs 22*a*, 22*b*. In one example, the selected color indicates the color of the coating that is currently being applied to the vehicle(s). In response to selecting the button from menu 22*b*, the application 175 displays dialog box 122, which provides a list of various color codes to choose from.

Figure 10:
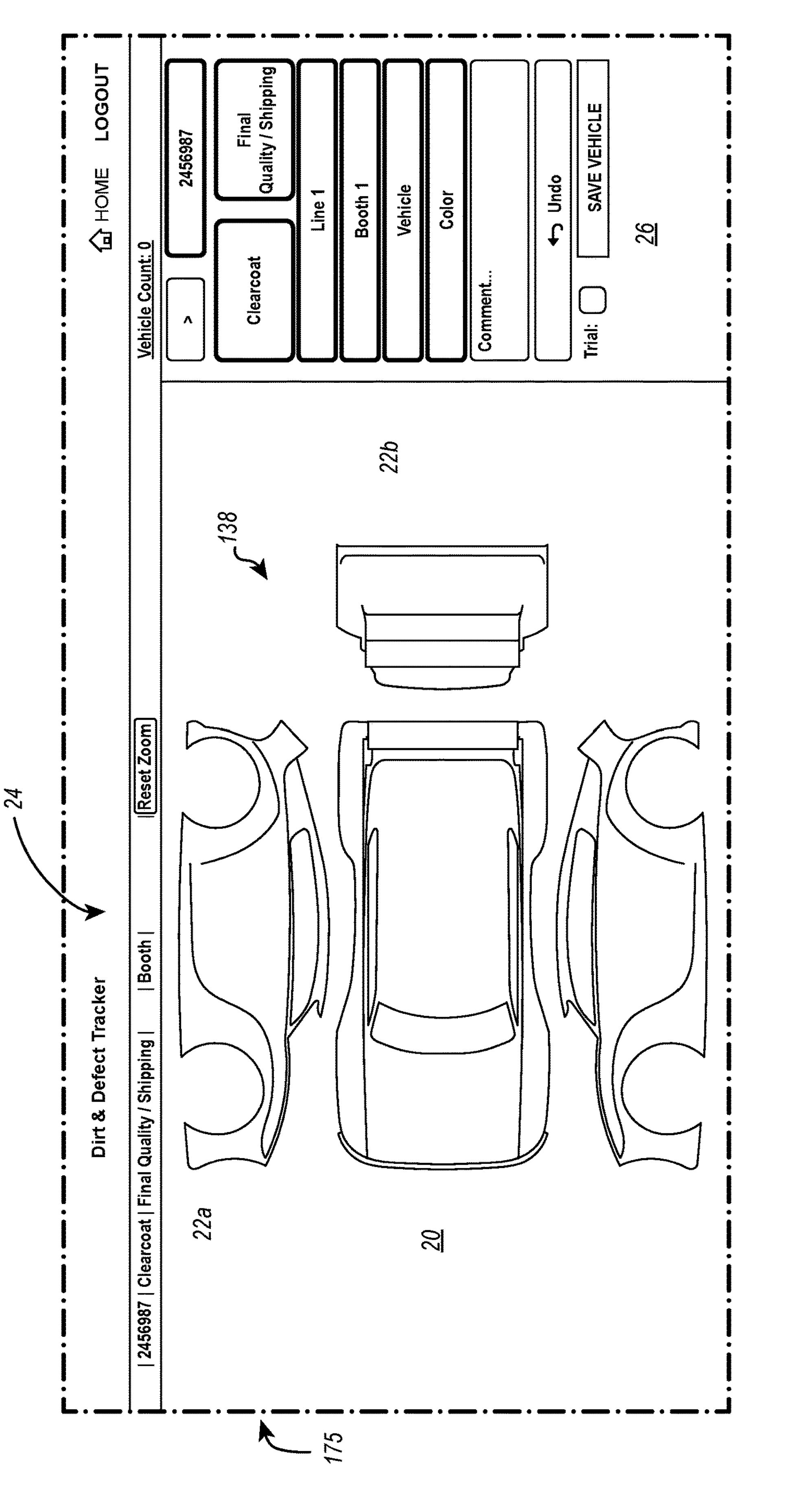
FIGS. 10 and 11 show various zoom in and zoom-out aspects of manipulating the user interface of the heat map.
Figure 11:
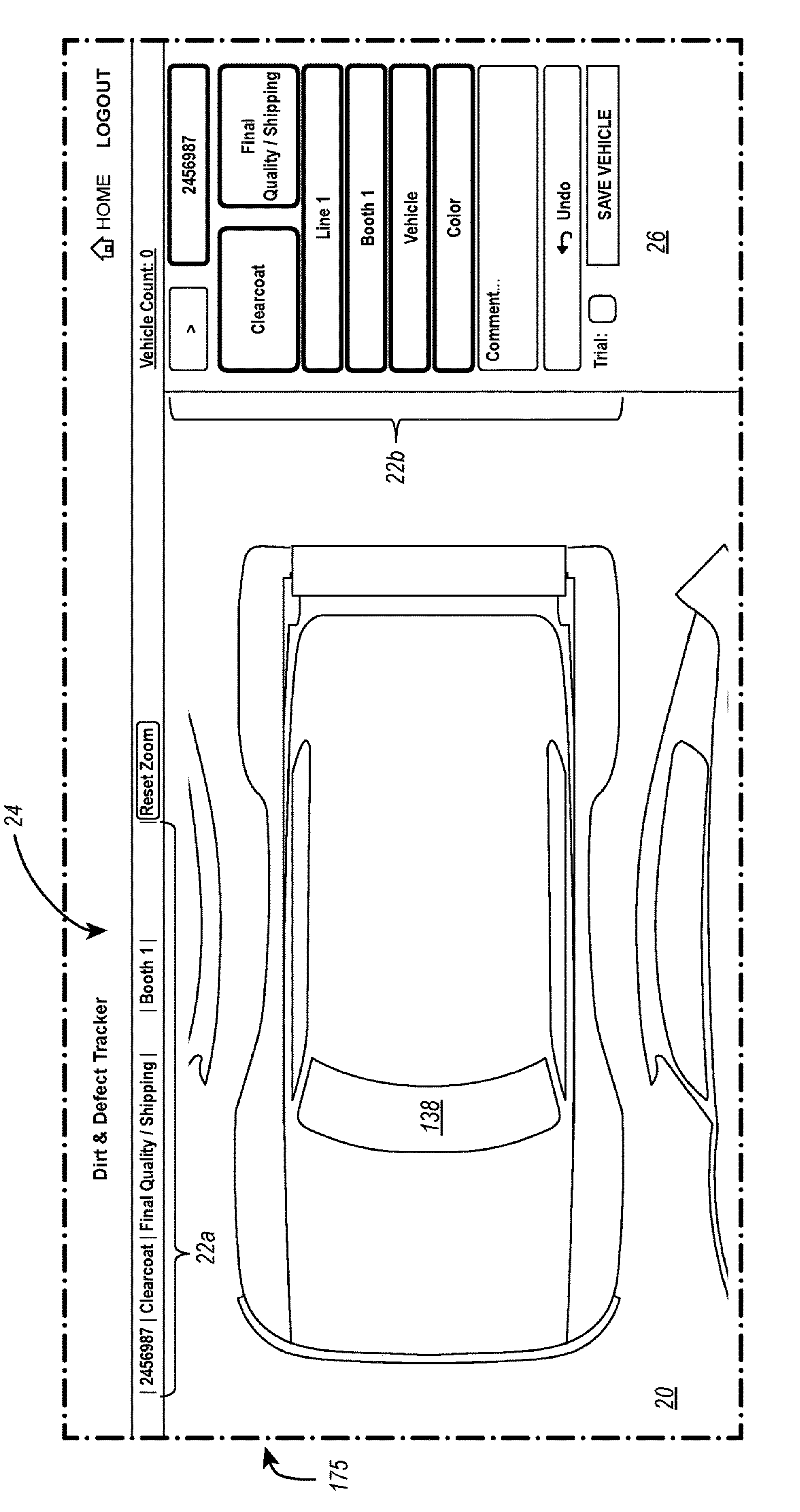

FIGS. 10 and 11 further show that the defect tracker 20 displays the plurality of selectable inputs 22*a*, 22*b* across a top selection bar 24 as well as a side menu 26. In at least one example, the top selection bar 24 and side menu 26 provide engagement with the user. As such, the user may select any one of the plurality of selectable inputs 22*a*, 22*b* to edit the previously-supplied vehicle and/or defect metadata, and even zoom in and out for close up and broad contextual views. For example, FIG. 10 illustrates a relatively zoomed out view of the model vehicle 138 heat map, while FIG. 11 shows a relatively zoomed in view, and menu 24 includes a "Reset Zoom" icon to enable a return to the original view.

Figure 12:
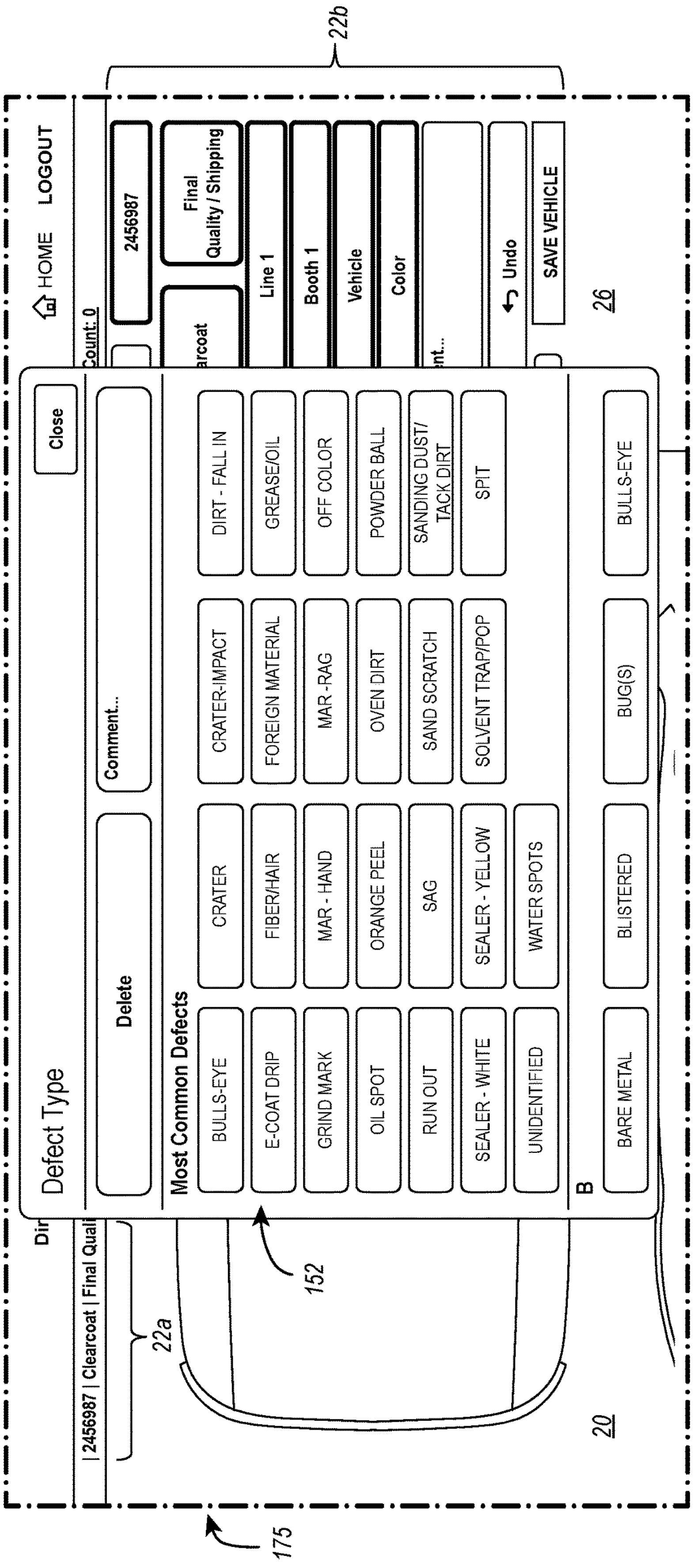
FIG. 12 illustrates an initial defect selection screen displayed on the application for tracking defects.

FIG. 12 illustrates an example of the defect tracker after a user has selected a point on the model vehicle 138 to provide a defect. In response, the application 175 can provide a first dialog box 152 to enable characterization of the defect. For example, the user can select that the defect is a "bulls-eye," "crater," "crater-impact," "dirt-fall in," "e-coat drip," "fiber," and so on. The computer system (or the user, as configured) will associate a distinct color for the selected defect so that each of the given defects can be distinguished by a different color, should they all be applied to the model vehicle 138. In at least one example, while a user is entering various vehicle and/or defect values, the interface 20 can display the updated information. As before, the interface 20 displays the plurality of selectable inputs 22*a*. 22*b* across a top selection bar 24 as well as a side menu 26. The user may select any one of the plurality of selectable inputs 22*a*, 22*b* to edit the previously-supplied vehicle and/or defect metadata, as well as select any one of the plurality of selectable inputs 22*a*. 22*b* to provide additional vehicle and/or defect metadata.

Figure 13:
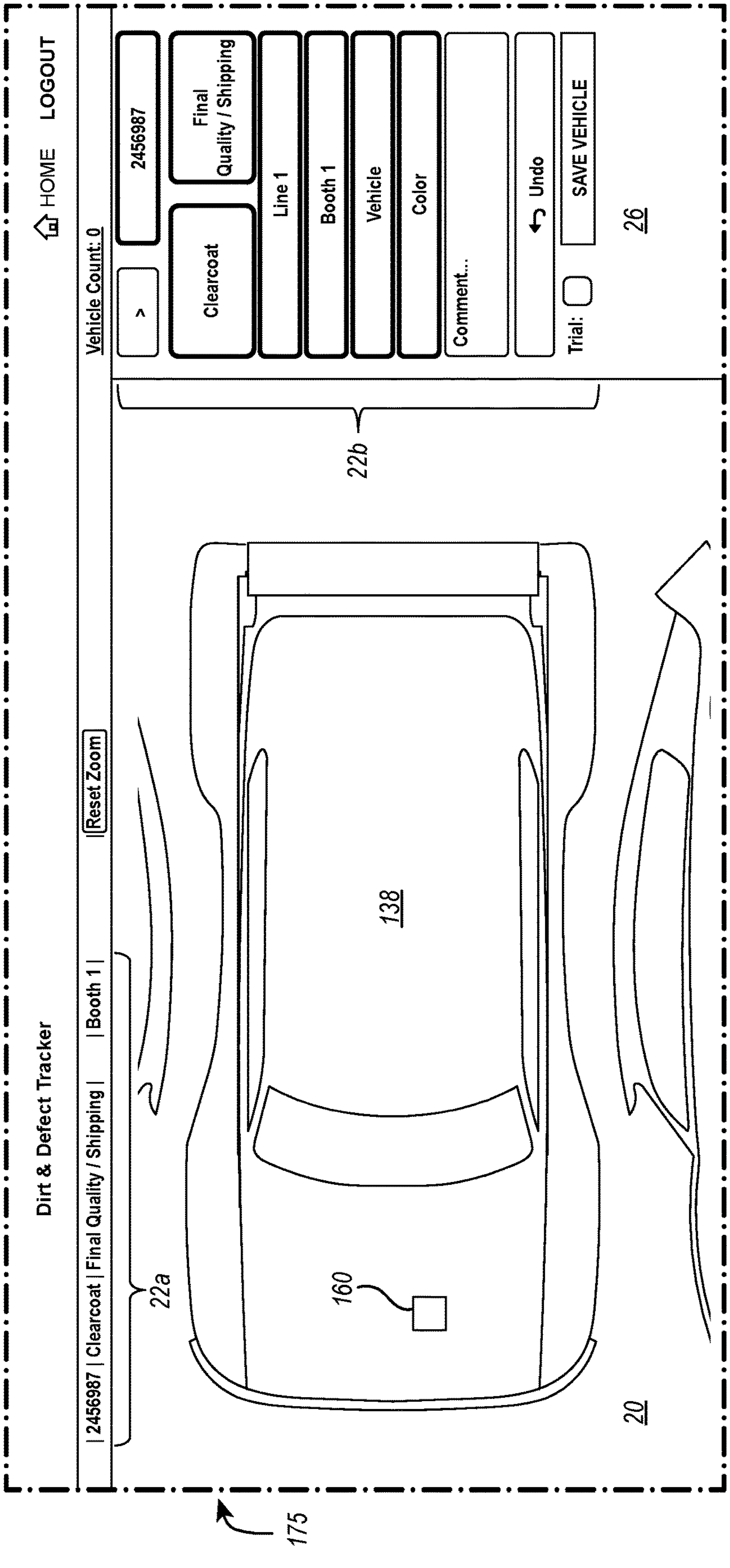
FIG. 13 illustrates a first selected defect displayed on the vehicle model heat map.
Figure 14:
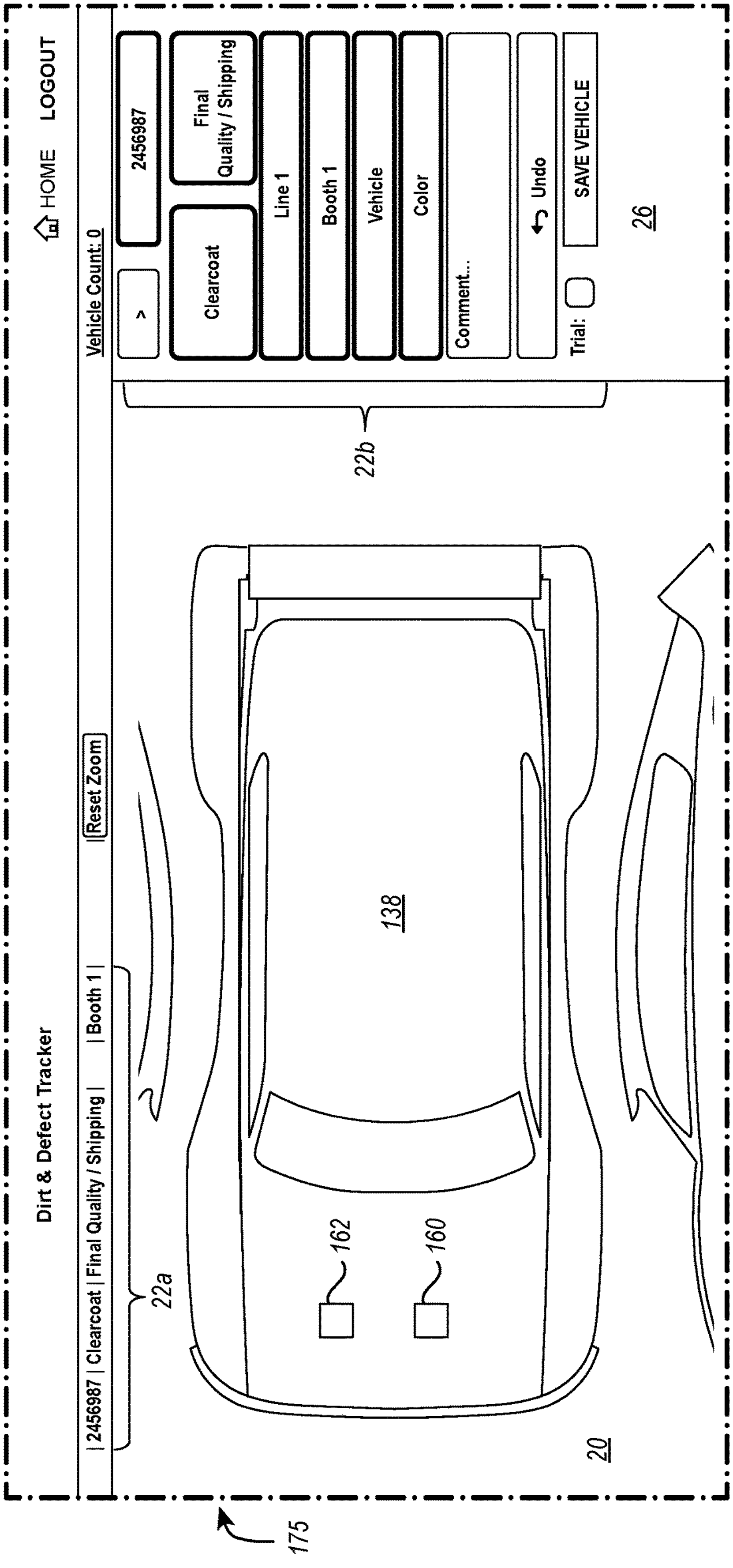
FIG. 14 illustrates the heat map of the modeled vehicle from FIG. 13, albeit with a second accumulated defect.

FIG. 13 illustrates that, once the user has identified the type of defect, the application 175 updates the model vehicle 138 on display 20 to show where the user tapped the vehicle to begin with, shown by square 160 on the hood. The application 175 may be configured by the user so that the default type of defect is already applied, so that when the user sees the next defect (e.g., 162. FIG. 14), they do not need to go through the defect characterization dialog box 152. Rather, application 175 can assume the same defect applies so that the next point the user taps will carry the exact same information about defect type. For example, FIG. 14 shows that a second defect 162 has been applied by the end user, in this limited case without having to reopen dialog box 152. Alternatively, one will appreciate that defect 162 may have been applied after the user first opened the dialog box 152 and selected a different defect type, so that defects 160 and 162 are different colors. In other cases, the user can select defect 162 after it has been applied, and then select it again to open dialog box 152 to recharacterize the defect 162 as a different defect other than the previous one defaulted to through selection of defect 160. The user may manipulate the image using any input device such as a mouse, a trackpad, or any other suitable device. Similarly, the user may manipulate the displayed image using pinch-and-slide finger movements, tapping directly on the screen, or any other touch-screen or other user interface gestures as appropriate.

FIG. 15 illustrates an example in which the application 175 has updated the user interface 20 to reflect a defect selection screen 150, which provides a number of further configurations for viewing all of the applied, user observed defects in a single glance, as well as a number of filtering options. In this case, top menu 24, and side menu 26 have been updated to correspond to the defect selection screen 150 with different user-selectable options and filters. As understood more fully from the following text and claims, the defect selection interface 175 (in addition to that shown in prior FIGS. 8-14), provides the user with the ability to apply various "output variables," meaning specific types of defects and various characterizations thereof.

FIG. 15 further illustrates the model vehicle 138 after the accumulation of several defects observed by one or more users in the particular line/booth, etc. in the defect selection screen 150. In this case, the defect selection screen 150 is showing a composite of all defects observed for each of the different layers applied. Nevertheless, in the side menu option 26, FIG. 15 shows that the user can filter the view of model vehicle 138 by selecting defects attributable only to the sealer layer, the ecoat layer, or the clearcoat layer. In addition, side menu 26 shows that each of the different observed defects can be listed along with a bar providing context for the number of times observed for the vehicle, or set of vehicles, observed during the particular time interval. The user can select any of the observed defects in menu 26 to show only those defects on vehicle model 138.

As before, the user can continually provide input and revisions to the vehicle and/or defect metadata, corresponding to the vehicle and defect types, using the screens described in FIGS. 3A-14. Moreover, the application 175 can be configured to process the information provided by the user and generate an image corresponding to that information. This processing can occur iteratively as the user moves through an entire defect tracking process. This processing may also be commanded by the user after all information has been supplied to the application 175. That is, the application 175 can be configured to generate a modeled vehicle 138 displaying a first selected defect 160. The defect metadata may include, for example, the location of the defect on the vehicle or part; the step in the process the defect was identified or occurred; and/or, where in the process (physically) the defect was identified or occurred. In addition, as the user provides more defect information, the application 175 can be configured to update the modeled vehicle 138 accordingly.

FIG. 15 further illustrates the heat map aspect of the accumulated defects. For example, the defect tracker dashboard 150 can be configured to display a dynamic heat map 182 that overlays a modeled vehicle 138, namely the illustration of several different defects that vary by color, as applicable by defect type. In addition, the heat map of vehicle model 138 can be configured to dynamically provide the user with defect concentration information, such as by implementing one or more machine learning algorithms to continually learn by associating numbers and types of defects found with the various input, output, and process variables used in the painting process. In particular, after multiple iterations of user identified defects, the one or more machine learning algorithms of the disclosed system can begin to automatically predict how certain coatings will perform under certain conditions, or predict the optimal input and processing variables for certain types of coatings. Such predictions, particular with refinement over time, can enable a user or autobody shop to mitigate such defects in advance by optimizing the types of coatings and operating parameters.

As an example, FIG. 15 shows that, in the heat map for vehicle 138, the interface displays areas of low defect concentration as individual dots and areas of high defect concentration as dots with increasing color intensity, and greater radius. In other words, the computer system can be configured to automatically modify the color and/or other visible indicia for a given defect to reflect other input, process, and output variables. For example, if an initial defect color selection for foreign material were light blue, the computer system may automatically make the defects appear darker, or more intense in color, or have greater radius due to the frequency of identification in any of a single or multiple vehicles in the line.

For example, menu 26 shows that foreign material 155 is the most common defect identified for this vehicle or set of one or more vehicle(s) being painted. By contrast, dirt 180, which in menu 26 is one of the lower frequency defects observed, shows up as a light-colored circle, which may be interpreted as representing it's normal, unadjusted color associated with that defect. The computer system may place other indicium overlaid on the defects as applicable such as numeric values that represent the true number of defects observed, or other forms of visual cues and identifiers that provide clear and immediate context.

In at least one example, the defect tracker dashboard 150 can allow a user to select an area of high defect concentration and the heat map of vehicle 138 can then be configured to "zoom in" to the selected area. In at least one example, the user may "zoom in" on an area of the vehicle or part and the heat map of vehicle 138 can additionally be configured to update the orientation over the zoomed-in area of the vehicle or part. The application 175 can be configured to display the heat map of vehicle 183 in grey-scale or in color to provide different visible contexts. The application 175 can additionally be configured to save the heat map of vehicle 138 as part of a defect tracking process corresponding to a particular time interval, such as a moment within the time interval.

The computer system can also provide the heat map so that the user can scroll along a particular time interval and view where and how defects have accumulated to create the view shown in FIG. 15. For example, in a replay view, the user may be provided with a historical movie for the time interval that shows the model vehicle at a first point in time, and shows the accumulation of defects as observed by an end user of one or more vehicles in a set over the course of the time interval. The end user can then use a progression bar, such as a slider bar, or a forward/backward progression or regression button to show the defect accumulation over time. In addition, the application 175 can enable the user to use other manipulation tools, such as to adjust the radius of the defects, color intensity of defects, and use of various other filters to provide rich contextual information at immediate access. The application 175 can enable the user to view defect tracker interface 150 to represent a single vehicle being painted, or even to select a single vehicle monitored from a set of one or more vehicles. In this way, the user can identify if the accumulated defects shown in FIG. 15 are due to a particular point in time, limited to a particular vehicle in the sequence, or roughly average for all vehicles passing through the same paint line/booth.

Although the present disclosure has been described in terms primarily of labeling and visibly displaying defects, the present disclosure is not so limited. For example, the report on visible inspection may reveal no defects at all. Alternatively, the previously identified defects for a particular vehicle or set of one or more vehicles may be remedied on a next pass, or the next pass after that, and so forth. Such information of a clean report can also be saved in context of other reports showing defects, and information of no defects may be in some cases as valuable as identifying when defects occur. In either case, it will be appreciated that the present disclosure provides rich and comprehensive methods and systems for easily logging observations of coating processes with vehicles, and all such information related to defect identification, or even determination of a clean report, can be readily managed, stored, and synthesized for the relevant computer system operating application 175. This can enable users to ensure resources and time are best spent in areas of highest need in coating process environments.

Figure 16:
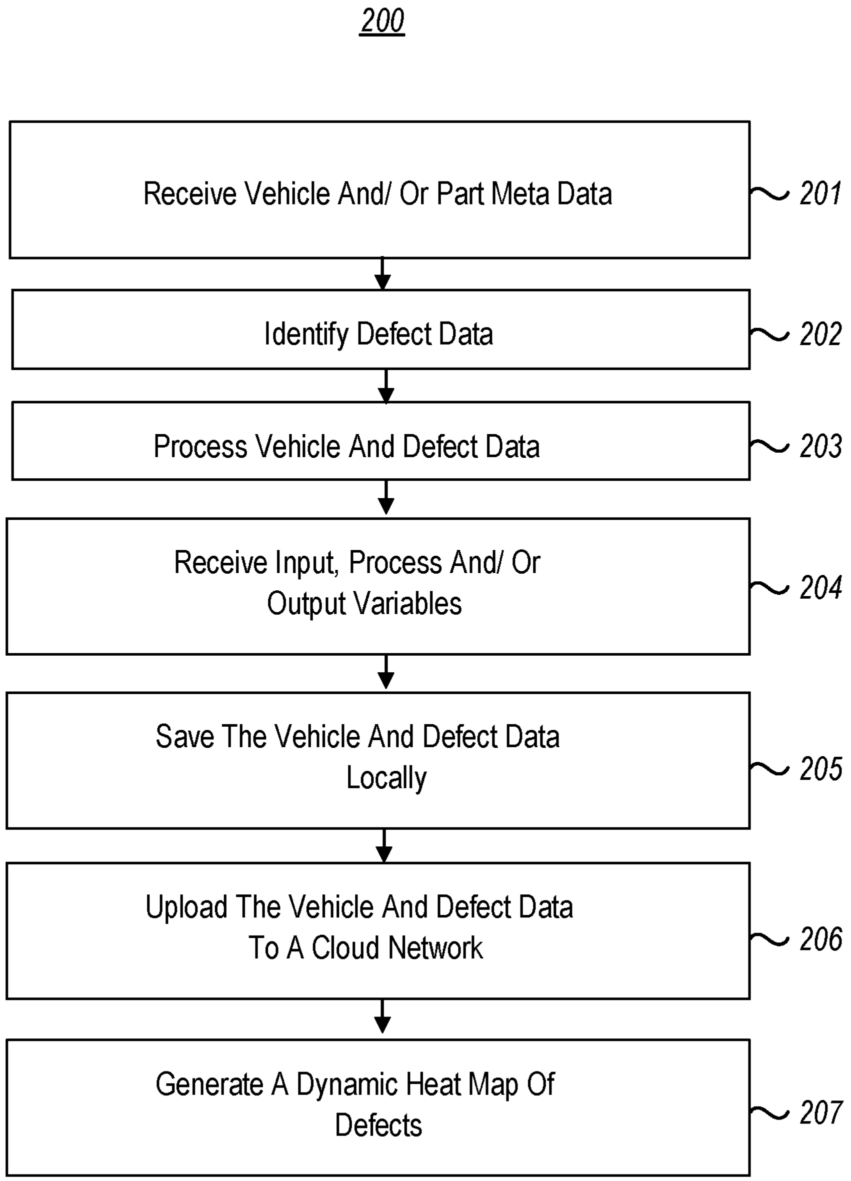
FIG. 16 illustrates a method of using a defect tracking system.
Figure 17:
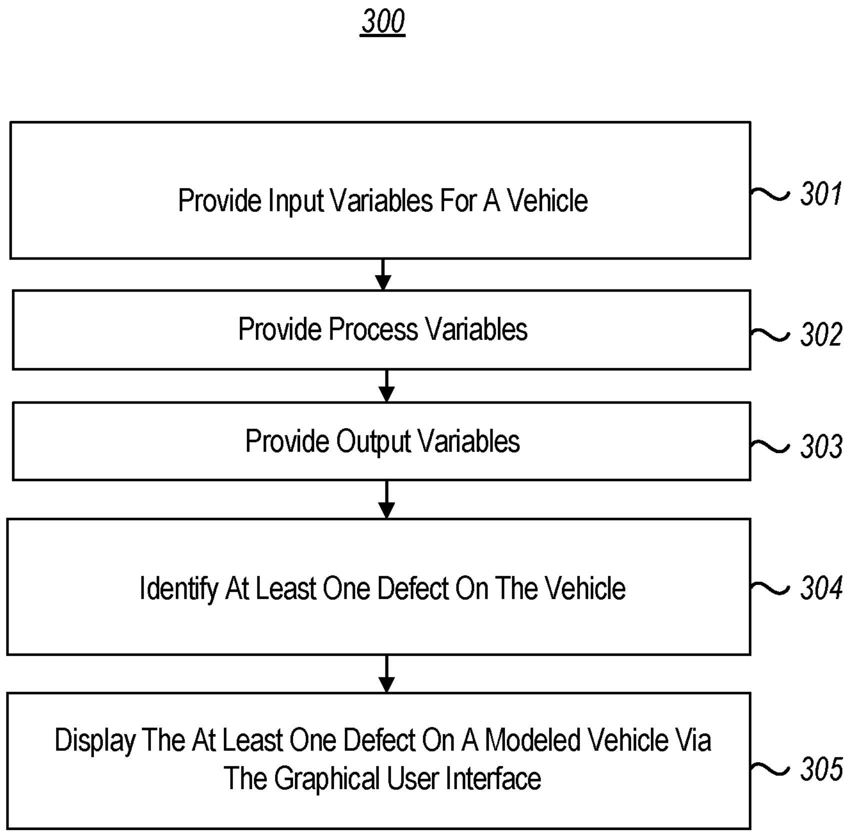
FIG. 17 illustrates another method of using a defect tracking system.
Figure 18:
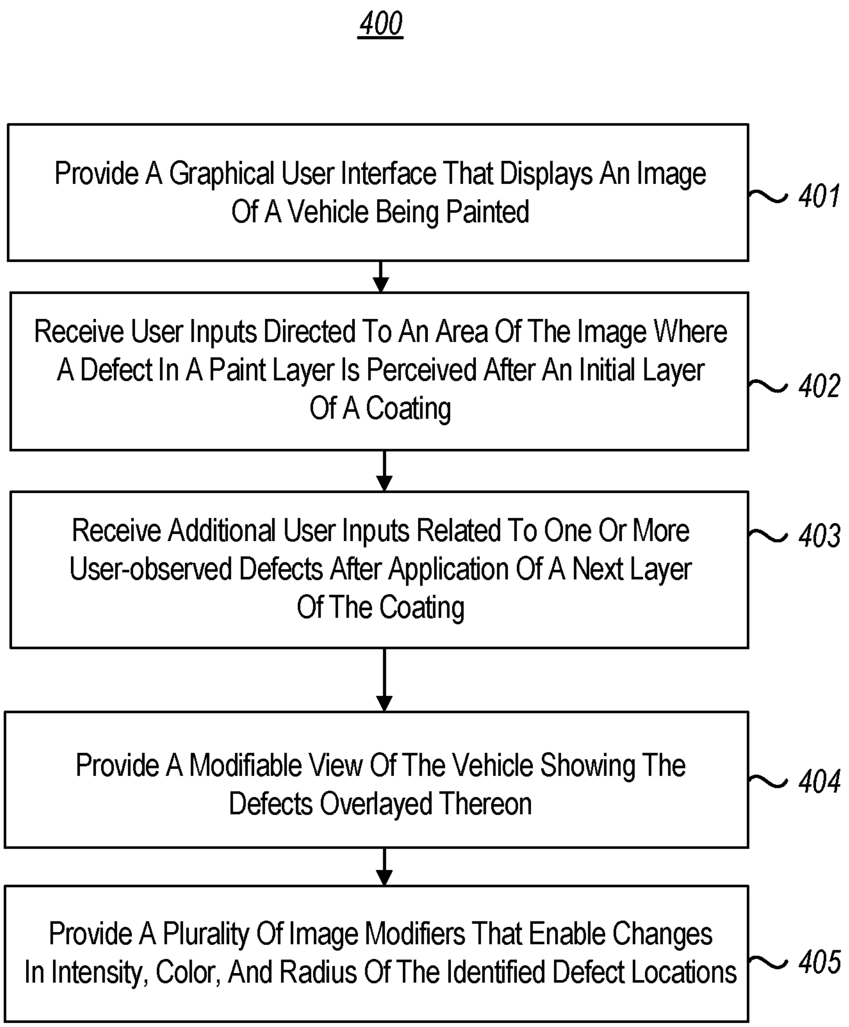
FIG. 18 illustrates still another method of using a defect tracking system.

Accordingly. FIGS. 1 through 15 provide a number of advantages in the art for monitoring coating or painting processes in both refinish shops and large assembly line coating systems. One will appreciate that the present disclosure can also be described in terms of methods comprising a series of acts for accomplishing a particular result. In particular. FIGS. 16-18 illustrate various flowcharts describing various methods and corresponding steps for tracking and representing defects (or other observations) through a user interface implemented through a computer system. The acts of FIGS. 16-18 are described below in the context of the Figures and corresponding elements of FIGS. 1-15.

FIG. 16 illustrates a method 200 of using a defect tracking system which can be implemented by an application 175 described herein. The application 175 may be executed on a tablet, mobile device or other suitable device. In at least one example of the method, the application 175 is configured to receive vehicle and/or part metadata related to a painting (or other) process at step 201. In at least one example, the application 175 is also configured to receive identifying defect data at step 202, and the vehicle and defect data may be processed at step 203. The method 200 may further include receiving input, process and/or output variables at step 204. In at least one example of the method 200, the application 175 can allow the generated dynamic heat map to be saved to a local network at step 205. In at least one example, the application 175 can upload the vehicle and defect data to a cloud network at step 206. The application 175 can be configured to generate a dynamic heat map of the defects at step 207. The generated dynamic heat map may be overlaid on a modeled version of the vehicle (FIG. 17).

FIG. 17 illustrates a flowchart comprising a series of acts in a computer-implemented method 300 for tracking defects corresponding to application of a coating to a vehicle. Method 300 (as well as method 400, FIG. 18) may be employed in a computer system (traditional desktop computer, laptop, phone, tablet, or the like) that is configured with a standalone, web-based, or distributed application. Method 300 and corresponding acts are described in context of the above-identified application 175 and related components described herein.

For example, FIG. 17 shows that method 300 can comprise an act 301 of providing input variables for a vehicle. Act 301 includes displaying on the display a graphical user interface having a plurality of user-selectable input variables for application of a coating to a vehicle, wherein the input variables enable user entry of data corresponding to (i) a vehicle identifier that identifies a set of one or more vehicles being coated, and (ii) a type of coating to be applied. For example, a user can open application 175 on a tablet, mobile device, or other suitable device, select the Dirt and Defect Tracker among the input options 12. The user can then access, for example, inputs 22*a*, 22*b* to provide information about a set of one or more vehicles undergoing a coating or painting process over a time interval, such as the vehicle ID that represents the set of multiple vehicles, or even just a single vehicle in some cases in the input box labeled VIN #, such as shown in box 32, FIG. 3A. In exemplified by FIGS. 4A-4B, the user can also input various data about the coating, such as the color, the type of coating, whether the coating is a primer, top coat, and the like.

FIG. 17 also shows that method 300 can comprise an act 302 of providing process variables. Act 302 includes receiving one or more process variables, wherein the process variables correspond to physical parameters of applying the coating on the one or more vehicles being coated. In general, process variables as used herein relate to physical application parameters related to the physical application of the coating on the set of one or more vehicles, such as temperature, humidity, air flow, bell speeds, ramp profile, fluid flow, film buildup, bell split, and the like. The data for such process variables can be supplied by the user, or retrieved from one or more relevant components applying the coating, e.g., via a direct or wireless link to robotic instruments used in the coating process. The user can access the process variables relevant to the set of one or more vehicles passing through the coating process in elements the elements presented in top or side menus 22, 26.

In addition. FIG. 17 shows that method 300 can comprise an act 303 of providing output variables. Act 303 includes displaying one or more output variables via the graphical user interface, wherein the one or more output variables allow the user to indicate user-observed characteristics of the coating as applied to the one or more vehicles over a time interval. Output variables can include appearance, color, dirt count, film builds, hardness, surface tension, gloss, other variables regarding detected and/or corrected defects, and/or combinations thereof. For example, FIGS. 11 through 15 show that the application 175 can provide various interfaces that allow the user to tap on the vehicle to identify a defect, as well as to select a given defect to provide further characterizations, such as the defect type (152, FIG. 12).

Furthermore, FIG. 17 shows that method 300 can comprise an act 304 of identifying at least one defect on the vehicle. Act 304 includes receiving from the user an identification of at least one defect on any of the one or more vehicles during a coating process, wherein each at least one defect is associated with a color. For example, as discussed herein, the defect selection screen 150 (FIG. 15) allows a user to identify and characterize a defect using one of a plurality of selectable buttons 152. As previously mentioned, the user can directly tap a particular location on the model vehicle to indicate the presence of a defect, and further select the particular defect through dialog box 152 to provide still further details about the observed defect, such as whether the defect is a water spot, a crater, fibrous material, or the like. The user can further upload one or more images or physical photos of the actual defect for future reference. In addition, the user or the computer-system itself can associate a particular color for each type of defect (e.g., water spot versus crater or fiber), so that defects can be readily distinguished on the vehicle model by color.

Still further, FIG. 17 shows that method 300 can include an act 305 of displaying the at least one defect on a modeled vehicle via the graphical user interface. Act 305 includes displaying, via the graphical user interface, a heat map over a modeled vehicle representing the set of one or more vehicles observed by the end-user over the time interval, wherein the heat map displays the at least one defect in the associated color. For example. FIG. 15 shows that the application 175 can display a modeled vehicle 138 containing an overlaid heat map 182 of defects and/or defect counts over a time interval. The time interval may represent all defects observed for a single vehicle, or for a set of multiple vehicles, so that the observed defects on the model represent an accumulation of defects. In one example, the accumulation of defects is for a set of multiple vehicles in an assembly line coating process. Darker spots in FIG. 15 represent regions of high frequency, where the system changes a radius or color intensity associated with given defects in the area. As described herein, the user can engage with and manipulate the heat map 182 overlaid on the modeled vehicle 138 by tapping the defect tracker dashboard 180 to identify additional details for each defect that may have been previously supplied by other end users.

FIG. 18 illustrates a flowchart of an additional or alternative computer-implemented method 400 for tracking user-observed defects through a computer system. As shown, method 400 can comprise an act 401 of providing a graphical user interface that displays an image of a vehicle being painted. Act 401 includes displaying on a digital display of the computer system a graphical user interface showing a model of a vehicle being coated in multiple steps with a coating, wherein the displayed vehicle is a model corresponding to a set of one or more vehicles undergoing a coating process over a time interval. For example, FIG. 10 illustrates graphical user interface 20, which displays a modeled vehicle 138 alongside a plurality of input variables 22, where the input variables 22 include information about the vehicle 138. In general, the model vehicle 138 will represent a set of multiple vehicles monitored through an assembly line coating process; however, the vehicle model can alternatively represent a single, particular vehicle. FIGS. 2 through 5 illustrate various input options that enable the user to characterize the vehicle(s) undergoing the coating/painting process, and aspects about the coating/paint being applied.

FIG. 18 also illustrates that method 400 can comprise an act 402 of receiving user input directed to an area of the image where a defect in a paint layer is perceived after an initial layer of a coating. Act 402 includes receiving, through the graphical user interface, one or more initial user inputs directed to an area of the image of the vehicle where a defect in a paint layer on any one of the one or more vehicles in the set is observed by the user after an initial layer of the coating has been applied to any vehicle in the set, and receiving user input that characterizes each observed defect as being of a particular type. For example, FIG. 14 shows that the user has identified one or more defects of a vehicle, and input the type of defect into the system using one of the selectable buttons 152. FIG. 15 shows that the user has identified the one or more defects 162 of the vehicle and provided the location on the vehicle to the system via the defect tracker interface 20 and the displayed modeled vehicle 138. That is, the user provided the location of the identified one or more defects 162 on the model vehicle 138 by tapping the corresponding location on the model vehicle 138.

In addition, FIG. 18 shows that method 400 can comprise an act 403 of receiving additional user inputs related to one or more user-observed defects after application of a further layer of the coating. Act 403 includes receiving one or more additional user inputs related to one or more user-observed defects after application of a further layer of the coating, and receiving one or more subsequent user inputs that characterizes each observed defect in the next layer as being a defect of a particular type. For example, FIG. 4A shows that a user can select at least one of a plurality of inputs 42 displayed on layer selection screen 40 to specify in what layer of coating the one or more defects have been identified (e.g., a clearcoat, sealer, etc.). The user can navigate to the layer selection screen 40 at any time during the painting or coating process, such as after a clearcoat has been applied but before a sealer has been applied to identify one set of defects. Additionally, as described elsewhere. FIG. 12 allows a user to select any one of a plurality of selectable buttons 152 to characterize the defect of a particular type (e.g., sag, crater, oil spot, etc.) The user can repeat the process for the next vehicle in the assembly line, and/or a next pass of the vehicle(s) through the coating/painting process so that model vehicle 138 shows an accumulation of all observed defects for the set of one or more vehicle(s).

Furthermore. FIG. 18 shows that method 400 can comprise an act 404 of providing a modifiable view of the vehicle showing the defects overlayed thereon. Act 404 includes displaying a modifiable view of the vehicle model showing each user-identified defect overlaid thereon, and with a different color that corresponds to each different type of defect. For example, FIG. 15 also shows that the heat map 182 displays areas of low defect concentration as individual dots. As discussed previously. FIG. 15 further shows that a user can manipulate the displayed heat map 182 using dynamic filters and display settings contained in the top bar 24 to correct or further characterize each particular defect (shown as a dot, or collection of dots. FIG. 15). The user can further select one or more defects to upload physical pictures taken of the defects for future reference.

Still further, FIG. 18 shows that method 400 can comprise an act 405 of providing a plurality of image modifiers that enable changes in intensity, color, and radius of the identified defect locations. Act 405 includes providing a plurality of image modifiers that enable the end user to provide input through the graphical user interface, wherein, in response to the input, the computer system adjusts an intensity, color, and/or radius of each identified defect to reflect at least a frequency of the observed defect in the set during the time interval. For example, FIG. 15 also shows that the heat map 182 displays areas of low defect concentration as individual dots. As discussed previously, FIG. 15 further shows that a user can manipulate the displayed heat map 182 using dynamic filters and display settings contained in the top bar 24. For example, the computer system can automatically modify each representative dot in terms of color intensity, radius, or textual overlays (e.g., a numerical identifier) to represent differences in frequency of the observed defect in that particular area of the vehicle(s) being monitored. Along these lines, FIG. 15 shows dots of differing darkness and radius to reflect computer adjustments to account for differences in frequency of a particular defect.

Accordingly, one will appreciate that the disclosure herein provides a number of advantages toward identifying coating defects, and better enabling repair and error correction. For example, embodiments of the present disclosure provide streamlined defect data collection in real time, with dynamic data dashboards allowing users to manage issues and key metrics on a day-to-day basis. Timely identification and characterization of coating defects means more defects can be adequately repaired earlier on in a coating process, resulting in less waste of coating resources. This also means fewer defects need to be repaired in off-line processes. Further, earlier identification of coating defects means fewer warranty costs related to coatings will be incurred, leading to long term savings of time, money, and resources.

Real time data collection coupled with the dynamic data dashboards also allow users to manage their carbon footprint by monitoring water and energy consumptions, as well as $CO_2$ emissions. Further, embodiments of the present disclosure allow users access to data having non-obvious impacts on sustainability, which users can utilize to more effectively impact their carbon footprints. As discussed above, monitoring the water and energy consumptions in a coating process can allow users to reduce the water usage per vehicle by approximately 20%. Thus, the present disclosure provides prompt, systematic, and easy to visualize and understand representations for how well a coating process is going, and next steps for solving any problems, thereby providing significant operational efficiency.

Examples of the present disclosure may comprise, be executed on, or otherwise utilize a special-purpose or general-purpose computer system that can include computer hardware, such as, for example, one or more processors and system memory, as discussed in greater detail below. Aspects of the present disclosure can also include physical and other computer-readable media for carrying or storing computer-executable instructions and/or data structures to implement any one of the functionalities, computer-implemented methods or applications disclosed herein. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, the disclosure can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the disclosure may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

A cloud-computing environment, or cloud-computing platform, may comprise a system that can include one or more hosts that are each capable of running one or more virtual machines. During operation, virtual machines emulate an operational computing system, supporting an operating system and perhaps one or more other applications as well. Each host may include a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

We claim:

1. A computer system configured to implement a method for tracking defects corresponding to application of a coating to a vehicle, comprising:

a display, and a processor; and computer-readable storage media having computer-executable instructions stored thereon that, when executed, cause the computer system to perform the following method:

displaying on the display a graphical user interface having a plurality of user-selectable input variables for application of a coating to a vehicle, wherein the input variables enable user entry of data corresponding to (i) a vehicle identifier that identifies a set of one or more vehicles being coated, and (ii) a type of coating to be applied;

receiving process variables, wherein the process variables correspond to physical parameters of applying the coating on the set of vehicles being coated;

displaying, via the graphical user interface, output variables via the graphical user interface, wherein the output variables allow the user to indicate user-observed characteristics of the coating as applied to the set of vehicles over a time interval;

receiving from the user an identification of at least one defect on any of the vehicles during a coating process, wherein each at least one defect is associated with a color; and displaying, via the graphical user interface, a heat map over a modeled vehicle representing the set of vehicles observed by the user over the time interval, wherein the heat map displays the at least one defect in the associated color.

2. The computer system as recited in claim 1, further comprising:

displaying, via the graphical user interface, a plurality of different identified defects on the modeled vehicle;

wherein each defect is associated with a different color representative of a different corresponding type of defect.

3. The computer system as recited in claim 1, wherein the input variables corresponding to coating type include indications of coating color, primer, and a number of coating applications.

4. The computer system as recited in claim 1, further comprising:

processing, by the processor, the provided input and output variables to generate the modeled vehicle as a historical video corresponding to the time interval;

wherein regression and progression of the historical video correspondingly changes the displayed heat map to display a correspondingly decreasing or increasing cumulative level of identified defects in the set of vehicles observed during the time interval.

5. The computer system as recited in claim 1, wherein each identified defect comprises user input corresponding to a size, or location of the defect on the modeled vehicle.

6. The computer system as recited in claim 1, further comprising:

identifying a plurality of defects in a particular location of the modeled vehicle; and displaying, via the graphical user interface, the plurality of identified defects on the modeled vehicle in a modified way to correspond to a number of times the identified defects was observed, wherein the modification includes any one or more of: (i) an increased radius of the identified defect, and (ii) a change in intensity of the color associated with the identified defect.

7. The computer system as recited in claim 6, further comprising:

receiving user input that adjusts a position in time for a historical video of the heat map on the modeled vehicle; and updating, by the processor, the heat map to show a change in one or more of the radius of the identified defect and the intensity of the associated color corresponding to the adjusted position in the historical video.

8. The computer system as recited in claim 6, further comprising:

receiving user input that adjusts a position in time for a historical video of the heat map on the modeled vehicle; and updating, by the processor, the display to show a change in color intensity of the identified defects shown on the modeled vehicle with the adjusted position in the historical video.

9. The computer system as recited in claim 1, further comprising:

receiving user input that selects one of the plurality of identified defects on the modeled vehicle;

receiving user input that adjusts the selected defect corresponding to any one of a type of the defect, a size of the defect, or a severity of the defect; and adjusting the color associated with the selected defect to correspond with the received user adjustment.

10. The computer system as recited in claim 1, further comprising:

receiving user input that selects one of the plurality of identified defects on the modeled vehicle;

receiving user input that provides a photograph of the identified defect on a vehicle; and storing the photo for later retrieval upon later selection of the selected defect.

11. The computer system as recited in claim 1, wherein receiving the process variables comprises retrieving the process variables from an instrument used to physically apply the coating to the vehicle.

12. The computer system as recited in claim 11, wherein the process variables comprise data corresponding to any one of temperature, humidity, air flow, bell speed, ramp profile, fluid flow, or bell split.

13. A computer-implemented method for tracking user-observed defects through a computer system, comprising:

displaying on a digital display of the computer system a graphical user interface showing a model of a vehicle being coated in multiple steps with a coating, wherein the displayed vehicle is a model corresponding to a set of one or more vehicles undergoing a coating process over a time interval;

receiving, through the graphical user interface, initial user inputs directed to an area of the image of the vehicle where a defect in a paint layer on any one of the set of vehicles in the set is observed by the user after an initial layer of the coating has been applied to any vehicle in the set, and receiving user input that characterizes each observed defect as being of a particular type;

receiving additional user inputs related to a user-observed defect after application of a further layer of the coating, and receiving subsequent user input that characterizes each observed defect in the next layer as being a defect of a particular type;

displaying, via the graphical user interface, a modifiable view of the vehicle model showing each user-identified defect overlayed thereon, and with a different color that corresponds to each different type of defect; and providing a plurality of image modifiers that enable the user to provide input through the graphical user interface, wherein, in response to the input, the computer system adjusts one or more of an intensity, color, and radius of each identified defect to reflect at least a frequency of the observed defect in the set during the time interval.

14. The computer-implemented method as recited in claim 13, wherein the modifiable view of the vehicle shows the defects overlayed thereon as a dynamic heat map.

15. The computer-implemented method as recited in claim 13, further comprising receiving and processing vehicle metadata to display the image of the vehicle being painted in multiple steps.

16. The computer-implemented method as recited in claim 13, wherein the graphical user interface is provided to a client computer over a network.

17. The computer-implemented method as recited in claim 13, wherein the graphical user interface is provided in a standalone application.

18. The computer-implemented method as recited in claim 13, further comprising receiving inputs regarding defects from an auto-inspection system.

19. A computer system configured to implement a method for tracking defects corresponding to application of a coating to a vehicle, comprising:

a display, and a processor; and a computer-readable storage medium having computer-executable instructions stored thereon that, when executed, cause the computer system to perform the following method:

displaying on the display a graphical user interface having a plurality of user-selectable input variables for application of a coating to a vehicle, wherein the input variables enable user entry of data corresponding to (i) a vehicle identifier that identifies a set of a plurality of vehicles being coated, and (ii) a type of coating to be applied;

receiving process variables, wherein the process variables correspond to physical parameters of applying the coating on the plurality of vehicles being coated;

displaying output variables via the graphical user interface, wherein the output variables allow the user to indicate user-observed characteristics of the coating as applied to the set of vehicles over a time interval;

receiving from the user an identification of a defect status on any of the vehicles in the set during a coating process; and displaying, via the graphical user interface, a heat map over a modeled vehicle representing the plurality of vehicles observed by the end-user over the time interval, wherein the heat map displays a defect status that is representative of an accumulation of user defect observations for the set of vehicles in the time interval.

20. The computer system as recited in claim 19, wherein:

the heat map displays a user-identified defect on the vehicle model in a scrollable display; and user selection that scrolls through the display changes an amount or color of displayed defects shown on the vehicle model.

21. The computer system as recited in claim 19, further comprising:

receiving user-identifications for each user-identified defect that correlates a color with each different defect type; and displaying, via the graphical user interface, the heat map with multiple colors over the vehicle model to visually clarify a difference in defect type; and displaying, via the graphical user interface, the heat map with different intensities of the same color to reflect differences in frequency of the user-identified defect in a particular location of the vehicle model.

* * * * *